(12) United States Patent
Kowalchyk et al.

(10) Patent No.: US 8,297,501 B1
(45) Date of Patent: *Oct. 30, 2012

(54) METHOD AND SYSTEM FOR ASSESSING MERCHANT RISK DURING PAYMENT TRANSACTION

(75) Inventors: Eric F. Kowalchyk, Campbell, CA (US); See Yew Mo, Campbell, CA (US); Jimmy M. Lu, San Jose, CA (US); Satish Buddhavarapu, Sunnyvale, CA (US); Michael J. Power, San Jose, CA (US); Janos Z. Mako, North Andovar, MA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,446

(22) Filed: Sep. 19, 2011

Related U.S. Application Data

(63) Continuation of application No. 12/495,371, filed on Jun. 30, 2009, now Pat. No. 8,020,763.

(51) Int. Cl.
*G06K 5/00* (2006.01)
(52) U.S. Cl. ............... 235/380; 705/37; 705/38; 705/40
(58) Field of Classification Search .................. 235/380; 705/37, 38, 40
See application file for complete search history.

(56) References Cited

U.S. PATENT DOCUMENTS

| | | | |
|---|---|---|---|
| 6,385,594 B1 | 5/2002 | Lebda et al. | |
| 7,149,296 B2 | 12/2006 | Brown et al. | |
| 7,542,993 B2 | 6/2009 | Satterfield et al. | |
| 7,653,590 B1 | 1/2010 | Kroon et al. | |
| 2003/0055783 A1 | 3/2003 | Cataline et al. | |
| 2003/0074298 A1 | 4/2003 | Daum | |
| 2003/0182194 A1 | 9/2003 | Choey et al. | |
| 2004/0230527 A1 | 11/2004 | Hansen et al. | |
| 2008/0010215 A1 | 1/2008 | Rackley, III et al. | |
| 2009/0204510 A1 | 8/2009 | Hwang | |
| 2010/0100469 A1 | 4/2010 | Buchanan et al. | |
| 2010/0180127 A1 | 7/2010 | Li et al. | |

OTHER PUBLICATIONS

Office Action mailed Feb. 3, 2011, in related U.S. Appl. No. 12/495,371, filed Jun. 30, 2009.

Notice of Allowance mailed Jun. 15, 2011, in related U.S. Appl. No. 12/495,371, filed Jun. 30, 2009.

(Continued)

*Primary Examiner* — Allyson Trail

(74) *Attorney, Agent, or Firm* — Vista IP Law Group, LLP

(57) ABSTRACT

A consumer tenders a transaction card to a merchant to purchase a good or service. A merchant payment device, such as a payment terminal or mobile communication device, processes the payment utilizing a risk assessment system. Card data received by the payment device is sent to the risk assessment system, which processes card data and generates an indicator representing risk associated with accepting payment using the card. The indicator is sent to the payment device to provide the merchant input regarding risk associated with using the card (e.g., likelihood of fraud or chargeback) in a seamless manner. If the risk level is too high, the merchant may reject the card. The risk indicator may be based on different types of data from different sources, e.g., data from a first source related to the consumer's credit history and data from a second source related to the consumer's identity.

29 Claims, 15 Drawing Sheets

OTHER PUBLICATIONS

Office Action mailed Mar. 21, 2012, in U.S. Appl. No. 12/771,750, filed Apr. 30, 2010.

Office Action mailed Sep. 2, 2011, Amendment filed Nov. 23, 2011, and final Office Action mailed Feb. 22, 2012, in U.S. Appl. No. 12/358,588, filed Jan. 23, 2009.

Office Action mailed Nov. 23, 2011, Amendment filed Feb. 23, 2012, Interview Summary mailed Feb. 27, 2012, and final Office Action mailed Apr. 25, 2012, in U.S. Appl. No. 12/769,571, filed Apr. 10, 2010.

Office Action mailed Apr. 4, 2012, in U.S. Appl. No. 12/845,080, filed Jul. 28, 2010.

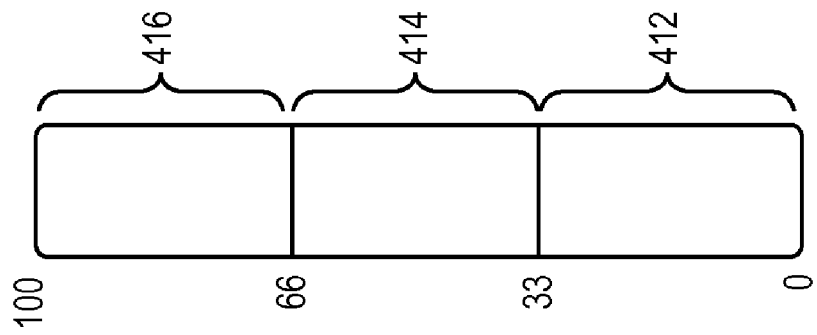
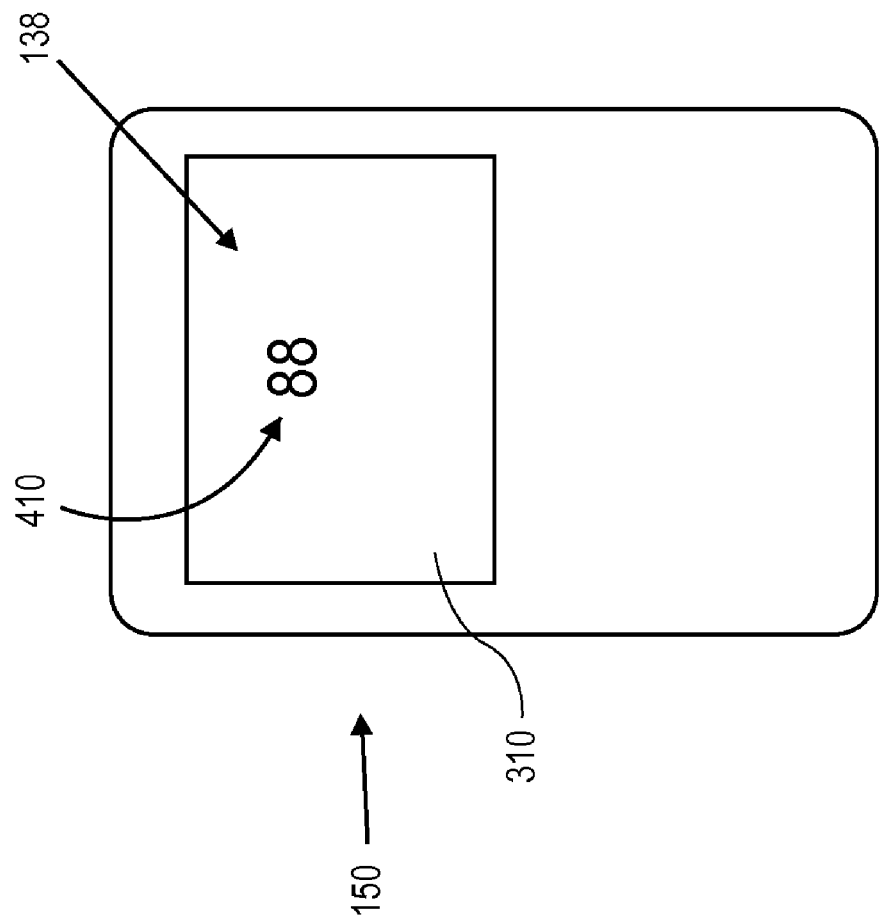

METHOD AND SYSTEM FOR ASSESSING MERCHANT RISK DURING PAYMENT TRANSACTION

RELATED APPLICATION

This application is a continuation of U.S. application Ser. No. 12/495,371, filed Jun. 30, 2009, now issued as U.S. Pat. No. 8,020,763 on Sep. 20, 2011, the contents of which are incorporated herein by reference.

BACKGROUND

The invention is generally related to electronic commerce and, more particularly, to assessing and reducing merchant risk associated with accepting electronic payments. Customers or consumers of retail establishments often pay for goods or services using a form of electronic payment such as payment or transaction cards such as credit cards. Some merchants utilize mobile communication devices for accepting payment. These merchants may utilize a cellular telephone or a personal digital assistant (PDA) that includes a payment application or software program for electronically accepting payments. These merchants can accept payments and complete transactions at various locations including various residential and commercial locations, houses, offices, job sites, cities, states and countries at various times.

During a transaction, when at a retail establishment or when dealing with a merchant that accepts payment with a mobile device, a consumer may tender a payment card such as a credit card to pay for the good or service. The merchant may enter credit card data into a payment terminal or the consumer or merchant may swipe the card through a payment terminal. If a mobile device is utilized, the merchant may enter data into the mobile device or swipe the card if the mobile device is so equipped. The transaction data is then sent to a third party payment processor that serves as an intermediary between the consumer and an issuer or bank to process the transaction using a merchant account of the merchant.

While many transactions are successfully completed using payment cards each day, fraudulent transactions such as identity theft, card skimming, etc. have become more common. In response to fraudulent activities, merchants, banks, payment processors, acquirers and card associations have employed various fraud detection systems. Factors considered by current fraud detection systems include the number of transactions completed during a certain time and the amount of the transaction. While existing fraud detection mechanisms have been effectively utilized to some degree, the amount of fraudulent activity can be reduced, and there are times when merchants at a retail establishment and merchants that utilize mobile devices for payment will provide goods or services to a consumer and not be compensated for those goods or services and instead be forced to accept a chargeback against his or her merchant account. A merchant may have little or no recourse in these situations, particularly if the consumer cannot be located.

SUMMARY

One embodiment is directed to a method for assessing risk associated with accepting payment from a consumer during a transaction. The method comprises receiving, at a payment device of the merchant, data related to a transaction card tendered by the consumer to pay for a good or a service provided by the merchant, receiving, at the payment device, an indicator representing the risk associated with accepting payment from the consumer using the transaction card, the indicator comprising a weighted score, a first portion of the weighted score being attributable to a first type of data, a second portion of the weighted score being attributable to a second type of data and determining whether to accept payment from the consumer using the transaction card based at least in part upon the indicator.

Another embodiment is directed to a system for assessing risk associated with a transaction involving a consumer and a merchant. The system comprises a payment device and a computer that hosts a risk assessment system. The payment device is operable process a payment by a transaction card tendered by the consumer to purchase a good or service provided by the merchant. The computer is operably coupled to the payment device through a network, and the payment device is operable to receive data related to the transaction card and to send the received data to the risk assessment system. The risk assessment system is operable to process the data related to the transaction card and to provide an indicator representing the risk associated with accepting payment using the transaction card. The indicator comprises a weighted score, a first portion of which is attributable to a first type of data, a second portion of which is attributable to a second type of data. The payment device is operable to receive the indicator from the computer, and a determination of whether to accept payment from the consumer using the transaction card is based at least in part upon the indicator.

In one or more embodiments, the payment device is a payment or point of sale (POS) terminal at a retail establishment. In other embodiments, the payment device is a mobile communication device that can be carried by a merchant and that is operable to process payments and receive the indicator generated by the risk assessment system. Examples of mobile communication devices that may be utilized in embodiments include a personal digital assistant (PDA), a cellular telephone, a portable POS terminal and other mobile computing devices that are capable of wireless communication. A mobile payment application can execute on the mobile communication device to process payment and to receive the risk indicator, which can be sent to the mobile device in different ways including via a POS terminal, as a text or Short Message Service (SMS) message, in a mobile payment application, on-line, etc.

The mobile communications device may have a card reader that is adapted for swiping of the transaction card such that the mobile device (or an application or program executing on the mobile device) can read the transaction card data. In other embodiments, the mobile device is not so configured and instead is operable or includes an application or program that allows the merchant to manually enter (e.g., type or speak) transaction card data using buttons or another interface of the mobile device. For example, a mobile device may receive, by swiping the card, by typing, or using near field communication or Bluetooth® communications, and other data entry methods, personal identification data of the consumer (e.g., name and address), a number of the transaction card (e.g., a credit card number), an expiration date of the transaction card and a security code of the transaction card (e.g., the three digit credit card security code). Bluetooth® is a registered trademark of Bluetooth Sig, Inc. Corporation.

In one or more embodiments, the risk assessment system is hosted by a computer or server that also hosts a merchant account of the merchant. The computer and/or risk assessment system may be hosted by, managed by, or accessed by a payment processor, which may also manage a merchant account on behalf of the merchant and serve as an intermediary between the merchant and the consumer to process electronic transactions involving the merchant and the consumer.

In one or more embodiments, a merchant accepts payment from the consumer using a payment or transaction card such as a credit card, a debit card or an automated teller machine (ATM) card if the risk indicator satisfies pre-determined criteria. Other embodiments may be adapted for use with other types of payment system and methods including, for example, PIN debit, ACH, eCheck, carrier billed, and PayPal®.

In certain embodiments, the indicator is a rating or score. The indicator satisfying pre-determined criteria indicates a low risk of accepting payment using the transaction card. For example, the indicator may be a score from 0 to a certain maximum number, and low risk is indicated by the score being less than a pre-determined number. As another example, the indicator may be based on positive and negative factors such that the score must be within a certain range of a negative number and a positive number, or within a certain range of two positive numbers, in order to indicate low risk. Otherwise, if the indicator does not satisfy the pre-determined criteria, the merchant may reject the transaction card if, for example, the rating or score is too high and thus indicates an unacceptable or high risk of fraud or chargeback, or if there are too many negative factors (e.g., too many chargebacks). In the event of high risk, the merchant may also accept a different form of payment from the consumer (such as cash or another form of electronic payment) or complete the transaction using a different transaction card. Merchants may define risk criteria for transactions such that transactions having risk indicators such as risk scores that satisfy pre-determined criteria are automatically accepted, whereas other transactions that do not satisfy pre-determined criteria are automatically rejected or flagged for review.

In various embodiments, the indicator generated by the risk assessment system is provided or displayed to the merchant through the mobile communications device. The indicator may be various forms including a numeric score, a letter grade, a bar graph or value, a color, or a combination of two or more types of indicators. For example, in embodiments in which risk is assessed relative to a range of risk values or numbers. A risk score that is less than a pre-determined number may represent acceptable risk to accept payment by a transaction card, whereas a score that is greater than a pre-determined number may indicate high or unacceptable risk. The score can also be displayed as a bar or line relative to a range of scores to represent the associated risk. The range of scores may, in one embodiment, represent the risk of all transaction types associated with a particular consumer. As a further example, a score that is less than a pre-determined number may be displayed with a green background to indicate that the merchant can proceed, whereas a score that is greater than the pre-determined number may be displayed with a red background to indicate that the merchant should consider rejecting the transaction card and obtaining payment in an alternative manner. A similar method may be applied if the risk score is based on positive and negative factors, for example, a chargeback would be a negative factor or value, whereas demonstrated payment history would result in a positive factor or value, and risk levels are defined relative to "0" such that a negative value would represent unacceptable risk, whereas a positive value would indicate acceptable risk.

In a further embodiment, a first type of data or a first data source may be assigned a negative factor or value, whereas a second type of data or a second data source may be assigned a positive factor or value. The final score may be a result of the positive and negative factors or values, which may or may not be weighted. Rules that are utilized may, in certain embodiments, depend on the data that is currently available and whether it is verified or confirmed. For example, a zip code that matches or is verified may be assigned a higher weight than its prior or normal weight.

In certain embodiments, the indicator is based at least in part upon credit-related or credit history data. For example, the name and/or address of the consumer as determined from the transaction card can be checked against a database storing a "black list" or "rejection list" including names and/or addresses of consumers that should be automatically rejected and from whom payment should not be accepted based on unacceptable credit ratings or prior experience involving the consumer. For example, a business name, personal name, address and/or account data may appear on a rejection list if it is known that the consumer has had electronic payment issues in the past and, therefore, it is too risky to accept payment from that consumer using electronic payment. Such a rejection list may also include business or personal names and/or account information or data such as transaction card account numbers and other related data.

Other embodiments may involve generating an indicator based on prior transaction data. For example, the indicator may be based at least in part upon data in a data source or database that stores data related to a notification that the consumer received an electronic mail receipt confirming a prior transaction, a chargeback resulting from a prior transaction involving the consumer, a fraudulent transaction involving the consumer, and feedback about the consumer provided by a merchant. Thus, for example, prior e-mail receipt confirmations may reduce the risk associated with accepting payment with the transaction card, whereas a prior chargeback or fraud using the card may result in an indicator that signals that the merchant should consider an alternative form of payment or a different transaction card.

In certain embodiments, the risk indicator is based at least in part upon personal identification or authentication data. For example, biometric data may be utilized to verify the identity of the consumer or ownership of the transaction card. For this purpose, biometric data such as a voice sample, a fingerprint or a photograph, is acquired and stored in a biometric data source. For example, such biometric data may be voluntarily submitted, provided a consumer is involved in a transaction or retrieved from another data source. At some later time, when the consumer is involved in a transaction, the merchant may request the consumer to provide personal identification or biometric data, e.g., by taking a photograph of the consumer using a cell phone or PDA or by acquiring a fingerprint with a fingerprint scanner, such that the photograph or fingerprint can be compared to the previously acquired photograph or fingerprint that is stored in the biometric data source and/or retrieved from another data source. Mismatching photographs or fingerprints may result in an indicator that informs the merchant that electronic payment may involve substantial risk and that the transaction card should be rejected.

In a further embodiment, the indicator may be based in part upon information provided by a wireless carrier of the consumer and/or the merchant that provides wireless communication services. For example, embodiments may be used to generate an indicator based on credit data and identification or authentication data received from a wireless carrier of the consumer. Wireless carrier data can be utilized when an owner of the transaction card also carries a wireless communication device such as a cellular telephone, and the merchant, e.g., through the risk assessment system, can confirm that the consumer with whom the merchant is communicating is also the person named on the wireless carrier account.

Further, location data may be utilized to confirm that the location of the cellular telephone on that account is the same as or near the location of the consumer in order to confirm the consumer's identity based on wireless carrier records. Moreover, the location of the consumer as determined by location based data may be compared against billing address information such as a street address or zip code of the transaction cardholder such that the location of the mobile communication device/consumer can be compared against the billing address or zip code of the card holder.

In certain embodiments, an indicator is based on credit or credit history related data and identification or authentication data such as biometric data. An indicator such as a score may be generated by the risk assessment system based on a variety of inputs or factors and based on data from various sources or databases. Thus, an indicator may be based on one type of data, multiple types of data (e.g., credit and identification data), data from one source, or data from multiple sources, and different combinations of data types and sources.

Further, a score may be generated or adjusted by assigning different types or sources of data different weights, or by assigning different types or sources of data negative or positive weights. Data used to generate an indicator or score may also be weighted and various rule sets may be utilized. For example, a first portion of the weighted score is attributable to a first type of data or a first data source, and a second portion of the weighted score is attributable to a second type of data or a second data source. Thus, the indicator or score can be a weighted indicator or score or weighted average that reflects the importance of each type or source of data.

An indicator may be based on data from various sources or databases, some of which may be local, others of which may be remote. The data sources or databases may be, for example, a database that is managed by a payment processor and is utilized to process electronic checks (e.g., to cross-check the name of the consumer), a state government database, a federal government database, a legal database, a business database and a credit database.

With embodiments, a risk assessment system that executes on a server or computer is utilized to provide an indicator or score to a merchant in real-time or in a seamless manner during the transaction, and the indicator or score may be based on different types of data and from different sources, to provide the merchant with input regarding whether there will be issues with accepting payment using the transaction card.

Certain embodiments of the invention may involve payment devices in the form of mobile devices that are used by mobile and non-mobile merchants to accept payment. While certain embodiments are described with reference to mobile devices, other embodiments of the invention involve providing risk indicators to non-mobile payment devices or terminals of retail merchants. For example, a risk indicator can be provided to a non-mobile payment device or terminal of a merchant, and the risk indicator may represent the risk associated with accepting payment from the consumer using a transaction card. For this purpose, the risk indicator provided to a non-mobile payment device or terminal may comprise a weighted score, a first portion of which is attributable to a first type of data (such as credit-related data), a second portion of which is attributable to a second type of data (such as personal identification or authentication data). Different types of data that are considered in generating the risk indicator may also be supplied by or retrieved from different data sources as in embodiments involving risk indicators provided to mobile devices.

BRIEF DESCRIPTION OF THE DRAWINGS

The foregoing and other aspects of embodiments are described in further detail with reference to the accompanying drawings, wherein:

FIGS. 4A-D illustrate embodiments and aspects of risk indicators, rankings or scores, wherein FIGS. 4A-B illustrate embodiments involving a binary risk indicator, FIG. 4C illustrates an embodiment involving a numeric risk score, FIG. 4D illustrates an embodiment involving a range of risk scores and risk levels.

FIGS. 11A-C illustrate embodiments involving a weighted risk indicator that accounts for various types of data, wherein FIG. 11A illustrates different types of data being assigned equal weighting, FIG. 11B illustrates different types of data being assigned different weighting to emphasize the relative importance of different data, and FIG. 11C illustrates one example of how certain types of data can be assigned positive and negative numbers to generate a risk indicator that may be a positive number or a negative number as shown in FIGS. 4E-F.

DETAILED DESCRIPTION OF ILLUSTRATED EMBODIMENTS

Figure 1:
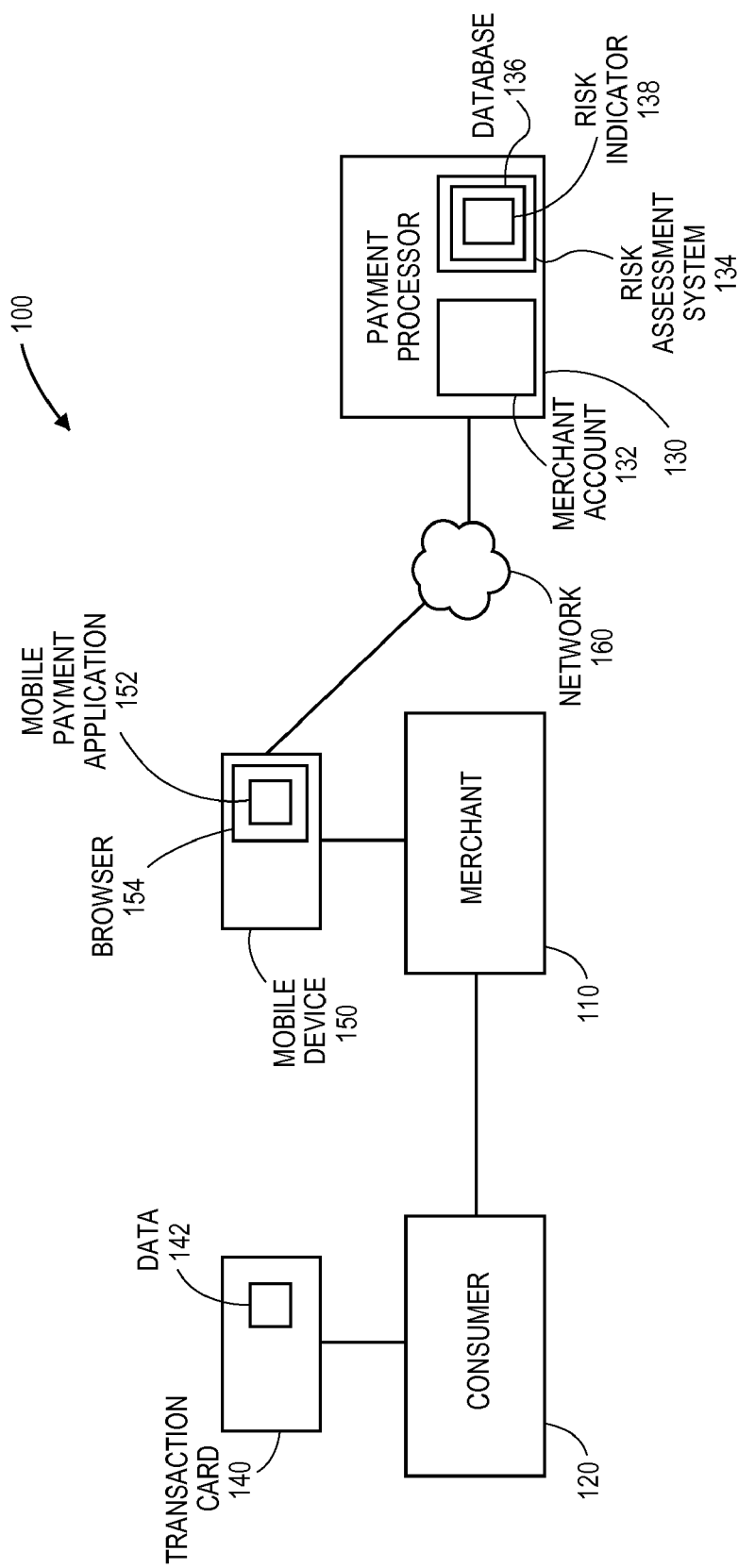
FIG. 1 is a block diagram of a system constructed according to one embodiment for assessing the risk associated with accepting payment from a consumer.

Embodiments relate to facilitating acceptance of electronic payments using a payment device or a payment terminal (generally referred to as "payment device"). In certain embodiments, the payment device is a POS terminal or other payment device at a retail establishment. In other embodiments, the payment device is a mobile communication device such as a PDA, a cellular telephone, a smartphone or a portable POS terminal that can be carried or transported by a merchant and that is operable to accept payments at various residential, retail and commercial locations and at various times. Electronic payment made using non-mobile and mobile payment devices may involve, for example, a payment or transaction card such as a credit card, a debit card, a gift card, an and ATM card, or other forms of payment such as ACH, eCheck, carrier-billed, PayPal® and other forms of payment capable of being received by a mobile device, in order to pay for goods or services provided by a merchant. PayPal® is a registered trademark of PayPal, Inc.

Embodiments provide systems and methods for assessing risk associated with accepting electronic payments from customers or consumers using non-mobile and mobile payment devices. With embodiments, a risk assessment system is managed by a payment processor computer that is in communication with the non-mobile or mobile payment device of the merchant. The payment processor also manages a merchant account of the merchant and serves as an intermediary between the consumer and a bank or card issuer to process the transaction involving the consumer and the merchant. The risk assessment system stores and/or generates risk indicators for consumers. When a merchant enters or receives electronic payment information at a payment device, e.g., by scanning a transaction card or by receiving or entering transaction card data into the payment device, the transaction card and other associated data is transmitted from the payment device to the payment processor. This information is used to retrieve a corresponding risk indicator from a risk indicator database of the risk assessment system. The risk indicator is transmitted to the payment device for consideration by the merchant who may then determine whether to accept payment using the transaction card in view of the risk indicator.

The risk indicator can be based on one type of data or different types of data, e.g., credit or transaction history data and personal identification or authentication data of the consumer. This data may be provided to the risk assessment system by the same or different sources. Data provided to the risk assessment system is transformed into a risk indicator. In certain instances, the risk indicator represents an unacceptable level of risk of fraud or chargebacks such that the merchant should reject the transaction card request payment in a different form, e.g., payment by cash. The risk indicator is requested, transmitted and displayed to the merchant in real-time in a seamless manner during the transaction such that the consumer is not aware that the risk analysis was performed.

Data provided to the risk assessment system can be transformed into a risk indicator in the form of a score, a letter or some other indicator that is sent to a payment device. The risk indicator can be based on various types and sources of data, which may be based on input or interactions involving the consumer, feedback by the merchant, data maintained by the payment processor and/or data that is retrieved from public and private sources. An indicator may indicate that the consumer has been identified in the past as being involved in fraud or chargebacks, in which case the consumer may be on a list of consumers that should be automatically rejected, whereas for other consumers, the indicator may be in the form of a number (e.g., ranging from 1-100) to indicate a level of risk associated with accepting payment using the payment device. For example, a low number may represent low chargeback risk, whereas a high number may represent a high chargeback risk. The indicator may also be a negative or positive number such that a negative number indicates that the consumer presents a higher level of risk or an unacceptable risk, whereas a positive number indicates a lower level of risk or an acceptable risk. Thus, with embodiments, merchants are able to complete transactions to accept payment for goods and services while making informed decisions to reduce the likelihood of fraud and chargebacks based on consumer data including credit history and/or personal identification or authentication data. Further aspects of embodiments are described with reference to FIGS. 1-12.

Figure 2:
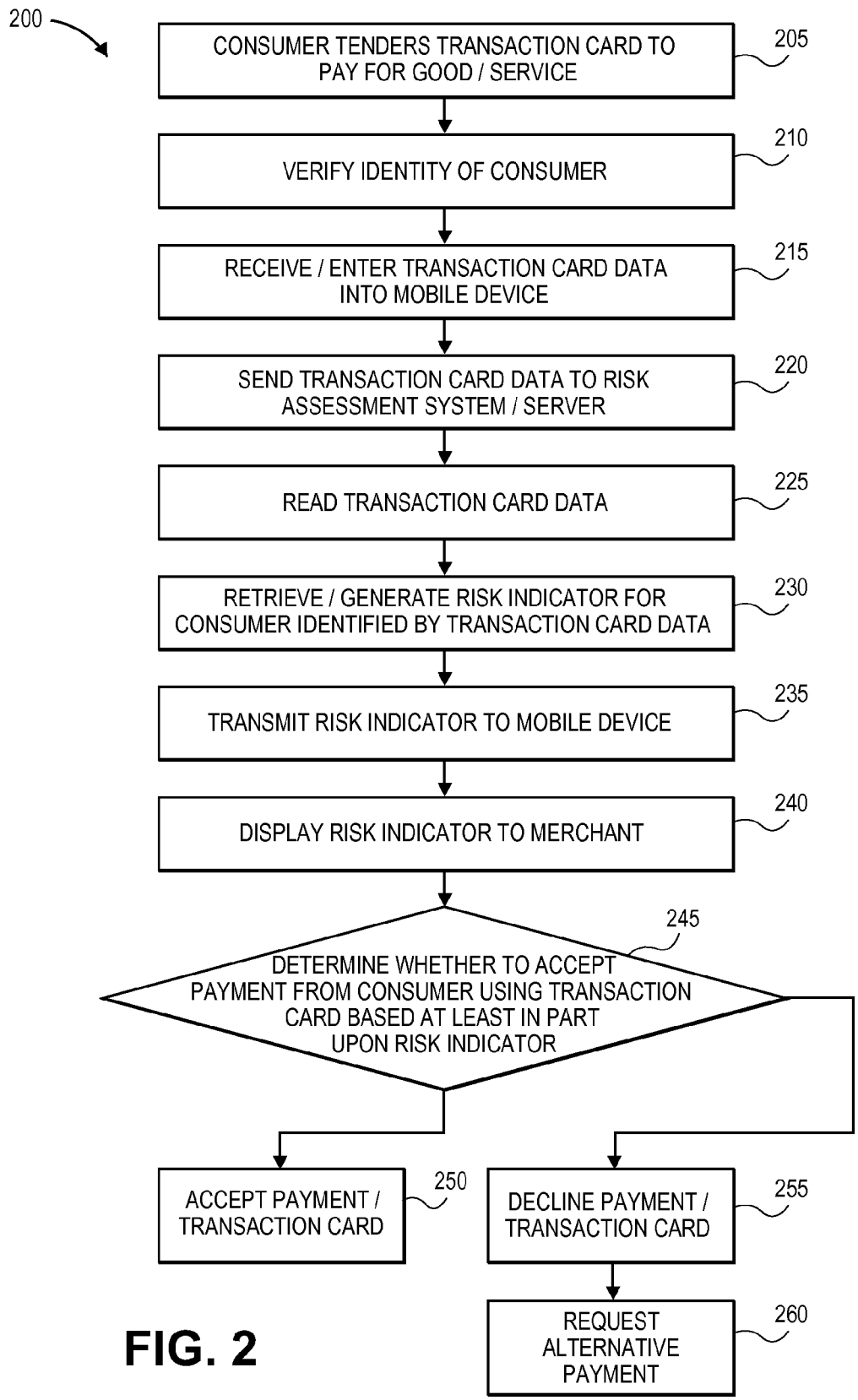
FIG. 2 is a flow chart of one embodiment of a method for assessing the risk associated with accepting payment from a consumer.

FIGS. 1 and 2 illustrates embodiments of a system 100 and a method 200 for assessing risk associated with a merchant 110 accepting electronic payment from a consumer 120 using a payment device 150. In the illustrated embodiment, the payment device is a mobile communication device 150 (generally referred to as a mobile device 150).

While embodiments may involve or be implemented using mobile devices 150, embodiments may also involve or be implemented using non-mobile payment devices such as payment devices at retail establishments. For ease of explanation, reference is made to payment devices generally or to mobile devices. However, it should be understood that such descriptions, FIGS. 1-2 and related figures are provided in a non-limiting manner to describe how certain embodiments may be implemented, and that other embodiments of the invention may involve or be implemented using non-mobile payment devices.

In the illustrated embodiment, the system 100 and method 200 involve a consumer 120 who tenders a transaction card 140 to the merchant 110 and a payment processor or payment processor computer or server 130 (generally referred to as payment processor 130) that hosts a risk assessment system 134 and is in communication with the mobile device 150 through one or more networks 160.

With the mobile device 150, the merchant 110 can accept payment at different geographic locations, e.g., at different residential, commercial and retail locations, at different offices, at different job sites, within different parts of a city, within different cities, different counties, different states, and/or different countries. Merchants 110 so equipped can complete transactions for goods and services using the mobile device 150 without having to be present at a particular store or establishment at which a merchant typically conducts business. Further, such merchants 110 can accept payments with the mobile device 150 at various times including at times during which a retail establishment may be closed.

For example, a merchant 110 may offer landscaping services and accept in-person payment from a homeowner consumer who tenders a credit card, other transaction card 140, or other form of payment to pay for landscaping services at the residence of the consumer 120. The transaction card data 142 is read by or entered into the mobile device 150 to process payment. As another example, a merchant 110 may be traveling while selling certain goods and accepts in-person payment from the consumer 120 using a mobile device 150. Thus, a merchant 110 who utilizes a mobile device 150 for payment is not restricted to operating from a retail establishment. However, since such merchants 110 are mobile, they may conduct business from various locations at various times, including at or near at or near retail establishments during or after business hours.

The payment processor 130 provides services of processing transactions involving the transaction card 140 and serves as an intermediary between the consumer 120 and an issuing bank (not illustrated in FIG. 1). The issuing bank acts as a recipient of proceeds of the transaction. For this purpose, the payment processor 130 hosts or manages a merchant account 132 on behalf of the merchant 110. The merchant account 132 allows the merchant 110 to accept payment using transaction cards 140 and other forms of payment. Examples of payment processors or payment processing systems 130 that provide these types of services include, for example, Innovative Merchant Solutions (an Intuit Inc. company), Chase Paymentech, Heartland Payment Systems®, Elavon® and First National Merchant Solutions®. Heartland Payment Systems® is a registered trademark of Heartland Payment Systems, Inc., Elavon® is registered trademark of U.S. Bank N.A., and First National Merchant Solutions® is a registered trademark of First National Bank of Omaha.

In the illustrated embodiment, the merchant account 132 resides on a computer of the payment processor 130, but the merchant account 132 may also reside on another computer that is accessed by the payment processor 130. Thus, it should be understood that FIG. 1 illustrates one system 100 configuration that may be utilized, and that one or more system 100 components, such as the merchant account 132, may be on different computers and/or on different networks.

With reference to FIG. 2, during a transaction, at stage 205, the consumer 120 tenders a form of electronic payment to pay for goods or services provided by the merchant 110. In the illustrated embodiment, and for ease of explanation, reference is made to a transaction card 140 such as a credit card, a debit card, an ATM card or a gift card, but embodiments may be implemented using other forms of payment, which may or may not involve a card.

At stage 210, the merchant 110 verifies the identity of the consumer 120, e.g., by checking the name on the transaction card 140 against personal identification (such as a driver's license) of the consumer 110 or by accessing other sources of personal or authentication identification data as described in further detail below. At stage 215, data 142 of the transaction card 140 is received or entered into the mobile device 150 of the merchant 110, e.g., as a result of swiping the transaction card 140 through the mobile device, the merchant 110 manually entering the data into the mobile device 150, from a communication device (not illustrated in FIG. 1) of the consumer 120, or from the consumer's transaction card 140. One example involving a mobile device of the consumer 120 is a credit card that is built into a cellular telephone of the consumer 120.

According to certain embodiments, the mobile device 150 of the merchant 110 is a cellular telephone, a smartphone, a PDA that has cellular telephone or wireless communication capabilities, a POS, or a cellular telephone or PDA that is equipped with a transaction card reader. In the illustrated embodiment, the mobile device 150 (such as a cellular telephone) can, as necessary, be adapted or configured for accepting electronic payments utilizing a mobile payment application or program 152 (generally referred to as mobile payment application 152) that executes on the mobile device 150. For this purpose, the mobile payment application 152 can be downloaded onto the mobile device 150 from the payment processor 130 or another source. Examples of mobile payment application 152 that are offered by payment processors 130 and that may be used in embodiments include GoPayment™, available from Intuit Inc., Charge Anywhere® Mobile POS software, Transaction Wireless and Air Charge®. Charge Anywhere® is a registered trademark of Comstar Interactive, Corp. and Air Charge® is a registered trademark of Aircharge, Inc.

Depending on the type of mobile device 150 and payment application or program 152 utilized, a web browser 154 may execute on a mobile communications device 150 to allow the merchant 110 to navigate the mobile payment application 152. Examples of web browsers 154 that may be used for this purpose include, for example, Internet Explorer®, Netscape Navigator® and Firefox®, Opera®, Avant Browser®, Lynx, Chrome, Flock®, Arachne. Internet Explorer® is a registered trademark of Microsoft Corporation, Netscape Navigator® is a registered trademark of Netscape Communications Corporation, Firefox® is a registered trademark of Mozilla Foundation, Opera® is a registered trademark of Opera Software AS Corp. (Norway), Avant Browser® is a registered trademark of Bosco Development Ltd., and Flock® is a registered trademark of Flock, Inc. Non-web browser software that is also capable of facilitating data entry for purposes of accepting electronic payments and facilitating data transfer utilizing a mobile device 150 may also be utilized for this purpose. Embodiments may also utilize a dedicated mobile payment application or other application capable of executing and navigating a mobile payment application 152. While various mobile devices 150, mobile payment applications 152 and web browsers 154 may be utilized in embodiments, reference is made to these components generally for ease of explanation and illustration.

Figure 3:
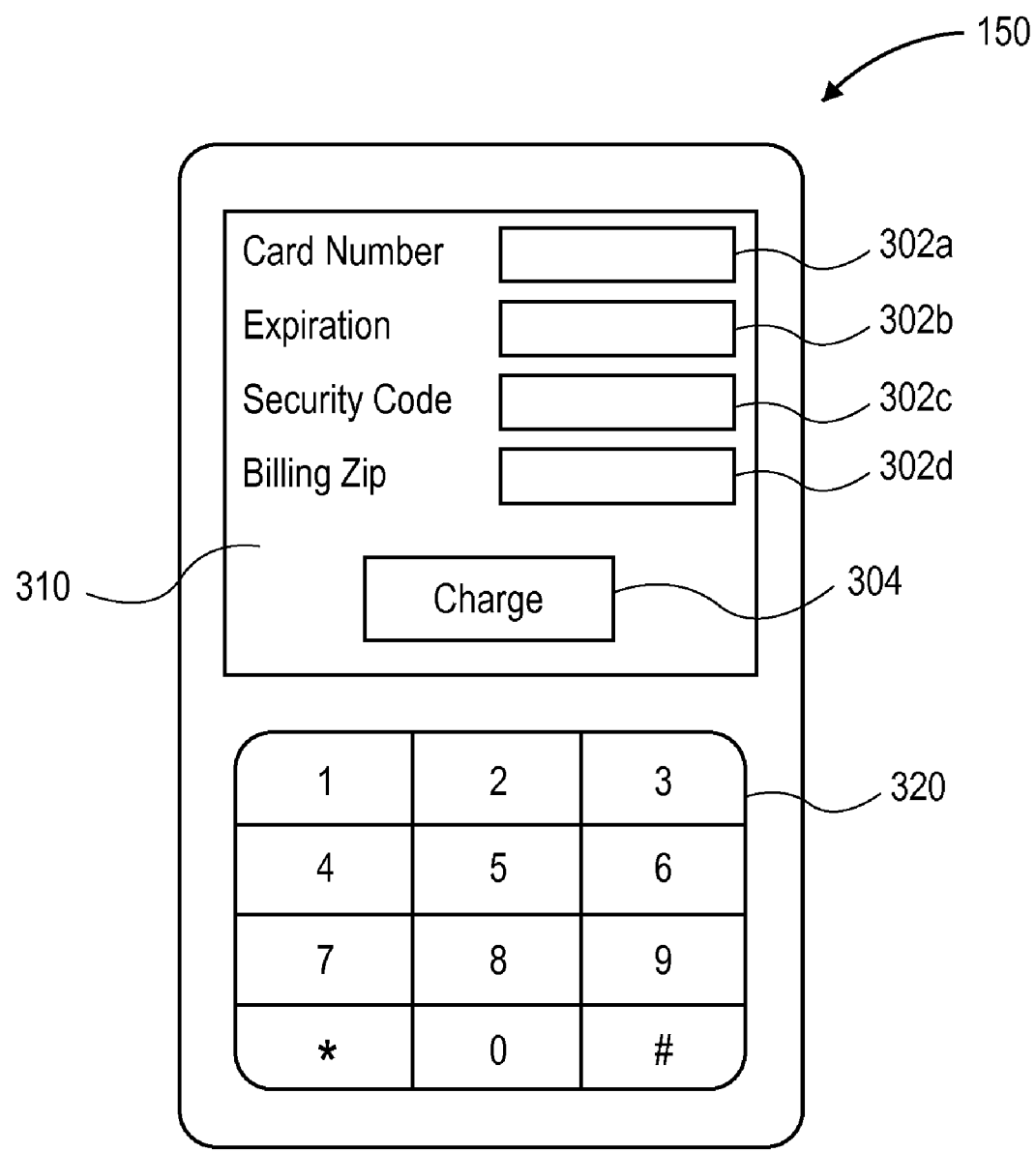
FIG. 3 generally illustrates an embodiment involving a mobile device utilized by a merchant for accepting payment and a page displayed by a payment application on the mobile device for entering or receiving transaction card data.

With continuing reference to FIGS. 1-2, and with further reference to FIG. 3, at stage 215, using the mobile payment application 152 or other software product, data 142 of the transaction card 140 is entered into fields of a screen or page generated by the mobile payment application 152. In the illustrated example, one or more of personal identification data including one or more of a number, an expiration date, a security code, a billing zip and other name and address information of the transaction card 140 are input into respective data entry fields 302*a-d* (generally 302) using a keypad interface 320 of the mobile device 150 or, in the case in which a mobile device 150 is equipped for swiping a transaction card 140, transaction card data 142 can be read by the mobile payment application 152 to populate data fields 302. Data 142 may also be transmitted from a mobile device of the consumer 120 to the mobile device 150 of the merchant 110 using wired or wireless communications such as near field communication, Bluetooth® communication, and other technologies capable of enabling communication between two devices. After the data fields 302 are populated, the merchant 110 can select "charge" 304 to initiate electronic payment and charge the transaction card 140 of the consumer 120.

Referring again to FIGS. 1-2, at stage 220, transaction card data 142 is transmitted from the mobile device 150 and over the network 160 to the risk assessment system 134 managed or accessible by the payment processor 130. Examples of networks 160 that may be utilized for communications between the mobile communication device 150 and the payment processor 130 managing the risk assessment system 134 include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 160 generally, but various networks 160 and communication methods may be utilized.

In the illustrated embodiment, the payment processor 130 hosts or manages the risk assessment system 134, which generates and stores, e.g., in a database 136, risk indicators 138 that relate to the risk associated with accepting payment from one or more consumers 120. The risk assessment system 134 may be implemented as software, hardware, or a combination thereof. For ease of explanation, reference is made generally to a risk assessment system 134, but the risk assessment system 134 may be implemented in various ways. Further, although FIG. 1 illustrates the risk assessment system 134 as hosted by the payment processor 130, the risk assessment system 134 or a portion thereof may reside on another computer that is accessed by the payment processor 130.

Referring again to FIG. 2, at stage 225, the risk assessment system 134 reads the transaction card data 142 to identify the consumer 120 or transaction card 140 (e.g., based on identification data such as name, address and/or transaction card number), and at stage 230, retrieves (or generates if necessary) a risk indicator 138 corresponding to the consumer 120 or transaction card 140 identified by the transaction card data 142.

At stage 235, the retrieved or generated risk indicator 138 is transmitted from the payment processor 130 to the mobile device 150. The risk indicator 138 may be sent to the mobile device 150 in different ways including via a POS terminal, as a text message, e.g., a SMS message, on-line or in the mobile payment application 152.

At stage 240, the risk indicator 138 is displayed or otherwise communicated to the merchant 120 and represents the risk associated with accepting payment from the consumer 120 using the transaction card 140 and the mobile device 150. At stage 245, a determination is made whether to accept payment from the consumer 120 using the transaction card 140 and the mobile device 150 based at least in part upon the received risk indicator 138 such that, at stage 250, payment is accepted, or at stage 255, the transaction card 140 is declined or rejected. At stage 260, the merchant 110 can, if desired, request an alternative form of payment (such as cash or another form of payment) from the consumer 120 if the transaction was rejected. Thus, with embodiments, a merchant 110 is not left to guess and hope that the payment will go through using a mobile device 150 and instead is provided input from the risk assessment system 134 to assist the merchant 110 in making a more informed decision.

Figure 4B:
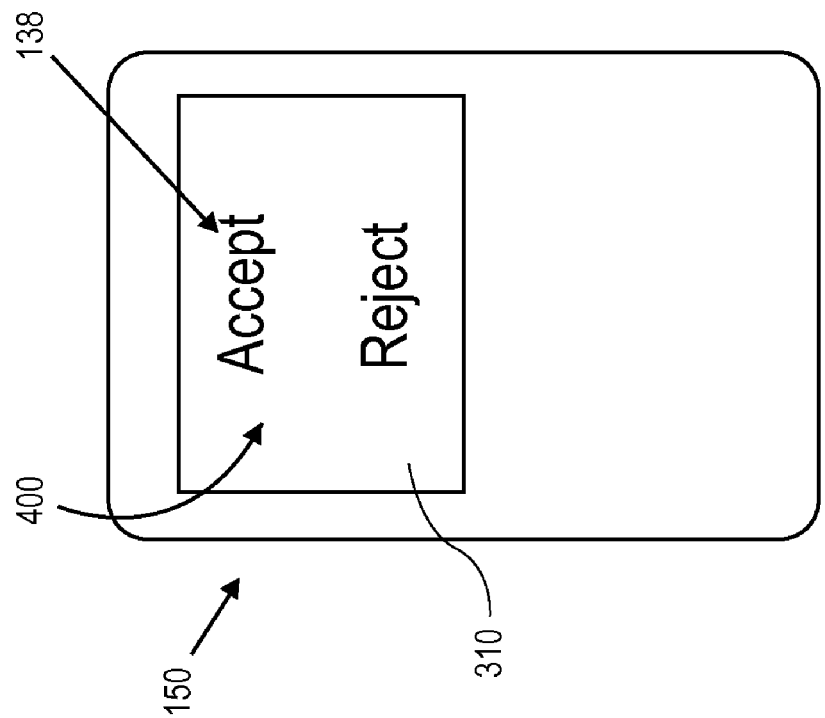
Figure 4A:
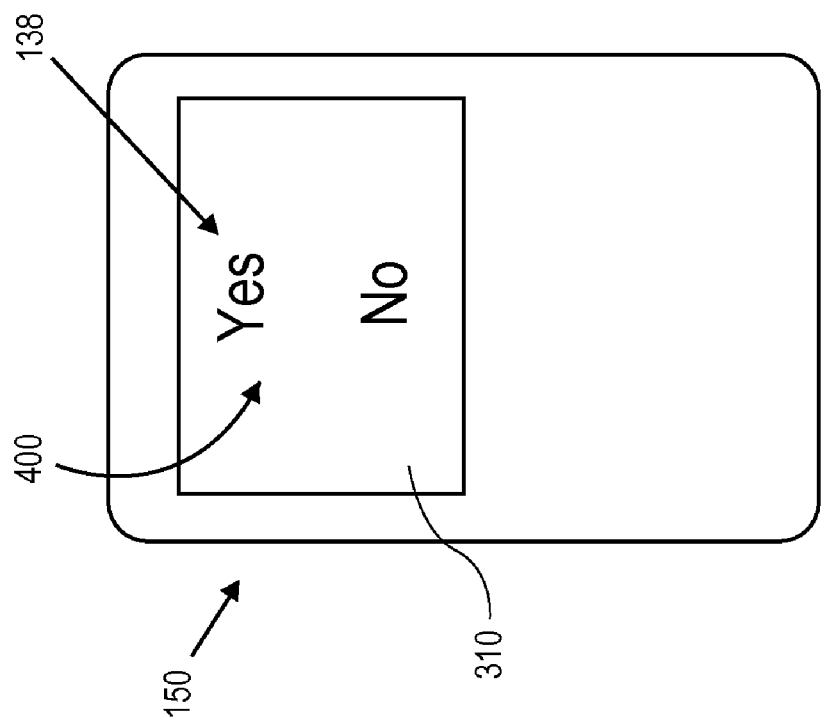

According to one embodiment, with further reference to FIGS. 4A-B, the risk indicator 138 is a binary indicator 300 such as a Yes/No indicator (as in FIG. 4A) or an Accept/Reject indicator (as shown in FIG. 4B). These indicators indicate, based on the data utilized to generate the risk indicator 138 (described in further detail below), the merchant 110 can or should proceed with accepting payment using the transaction card 140 and the mobile device 150 if the risk level is sufficiently low, or whether the risk level is too high such that the merchant 110 should reject or decline the transaction card 140 and request alternative payment. An intermediate indicator (e.g., "proceed at your discretion") or a non-determinate indicator ("risk indicator not available") may also be displayed to the merchant 110 if there is not sufficient information about the consumer 120 or transaction card 140.

Referring to FIG. 4C, according to another embodiment, the risk indicator 138 is a number, a score or a ranking 410 (generally referred to as a risk score 410) that can be interpreted by the merchant 110 who determines whether the risk level is sufficiently low to accept payment using the transaction card 140 or whether the risk level is too high such that the transaction card 140 should be rejected. For example, with further reference to FIG. 4D, according to one embodiment, a risk score 410 may range from 0 to 100, "0" representing no risk, and "100" representing the highest, unacceptable risk.

The risk assessment system 134 may be configured such that certain numbers serve as cut-offs between different risk levels. In the embodiment illustrated in FIG. 4D, three risk levels are defined: low risk 412, medium risk 414, and high risk 416. Low risk 412 is defined as a risk score 410 of 0-33 and indicates acceptable low risk levels such that the transaction card 140 can be accepted for payment, medium risk 414 is defined as a risk score 410 of 34-66 and indicates that the merchant 110 can proceed while assuming the risk and/or requesting additional information to verify the identify of the consumer 110 or other information, and high risk 416 is defined as a risk score 410 of 67-100 and may indicate a high risk of fraud or chargeback such that the transaction card 140 should be rejected. It should be understood that a risk score 410 range of 1-100 is provided as a non-limiting example of how embodiments may be implemented, and that different ranges and cut-off values defining different numbers and ranges of risk levels may be utilized. Further, a similar score or ranking system can be implemented using letters, e.g., A-Z, or other scoring or ranking methods.

Figure 4E:
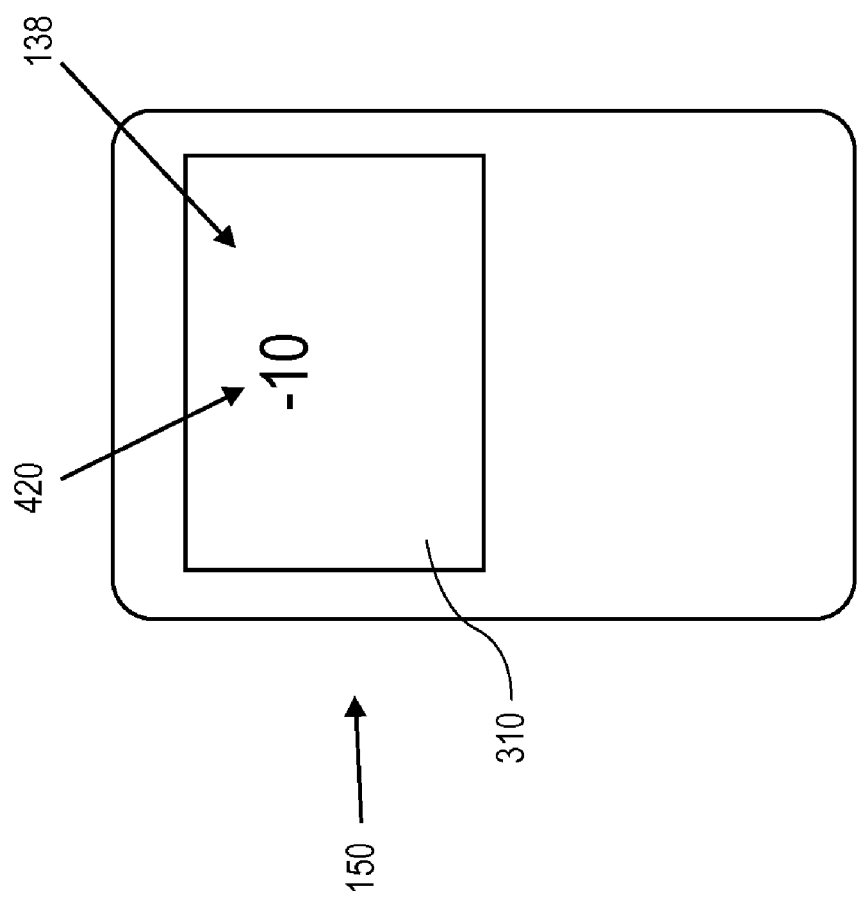
FIG. 4E illustrates another embodiment involving a numeric risk score.
Figure 4F:
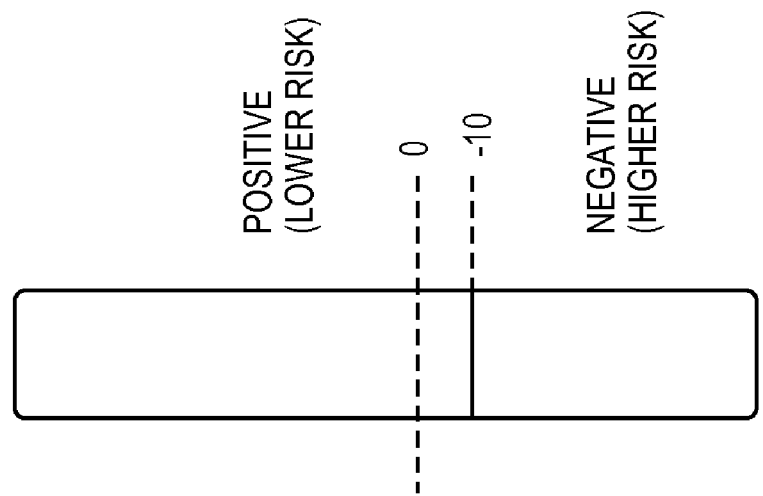
FIG. 4F illustrates an embodiment involving positive and negative factors for determining a risk score.

Referring to FIGS. 4E-F, according to another embodiment, the risk indicator 138 may be a positive or a negative number, score or ranking 420 (generally referred to as risk score 420). A negative risk score 420 may represent a high level of risk such that the transaction card 140 should be rejected, whereas a positive risk score 420 may represent a low level of risk such that the transaction card 140 can be accepted. Different types of data used to generate or adjust the risk indicator may be assigned positive or negative values, and the end result of adding or averaging the values, or adding or averaging weighted values, provides a final risk score 420 representing acceptable or unacceptable risk. In certain embodiments, the possible minimum and the maximum possible score may be represented as a range of scores, and a bar or line is illustrated within that illustrated range to represent the risk of the transaction with that consumer 120. In certain other embodiments, the range of scores represents the risk of all the possible transaction types with that consumer 120.

In an alternative embodiment, or as a supplement to binary indicator 400 and risk score 410, 420 embodiments shown in FIGS. 4A-F, a display screen 310 or portion thereof of the mobile communication device 150 may be a certain color to indicate or further emphasize the risk indicator 138 or risk level. For example, a "yes" binary indicator 400 (FIG. 4A) may be displayed with a green background, whereas a "no" binary indicator 400 (FIG. 4A) may be displayed with a red background. A yellow background may be displayed if the risk indicator 138 is non-determinative. Further, a risk score 410 of 0-50 may be displayed with a green background to indicate that the risk level is low and the merchant 110 can proceed with accepting payment using the transaction card 140, whereas a risk score 410 of 51-70 may be displayed with a yellow background to indicate that the merchant 110 should exercise caution and/or request additional information, and a risk score 410 of 71-100 may be displayed with a red background to indicate an unacceptable level of risk such that the transaction card 140 should be rejected. Similar color coding may be applied to display a negative indicator 420 with a red background and a positive indicator 420 with a green background.

According to one embodiment, the risk indicator 138 provided to the merchant 110 is a binary indicator 400 (e.g., as shown in FIGS. 4A-B). According to another embodiment, the risk indicator 138 provided to the merchant 110 is a score 410, 420. According to yet another embodiment, the risk indicator 138 provided to the merchant 110 includes multiple indicators or multiple indicator components such as a binary indicator 400 and a score indicator 410, 420. Further, these embodiments may be displayed with a certain color codes. For ease of explanation, reference is made generally to a risk indicator 138, which may include one or multiple indicators or indicator components.

Figure 5:
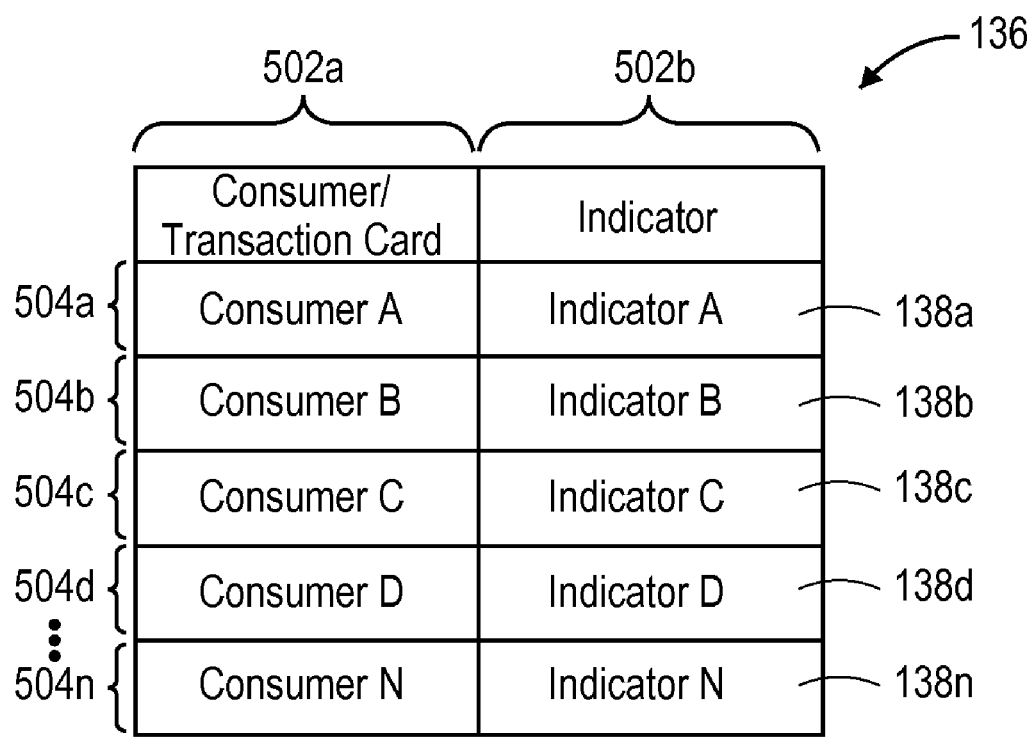
FIG. 5 illustrates a database or table of risk indicators for various consumers that is managed or accessed by a risk assessment system according to one embodiment.

Referring again to FIG. 1, and with further reference to FIG. 5, in the illustrated embodiment, the risk assessment system 134 is managed by the payment processor 130, and risk indicators 138 can be stored in a database, data store or look-up table 136 (generally referred to as database 136). When the risk assessment system 134 receives transaction card data 142, the risk indicator 138 corresponding to the consumer 110 name as identified by the data 142 is retrieved from the database 136 and sent to the mobile device 150 of the merchant 110.

One example of a database 136 that may be utilized for this purpose includes a column 502*a* for names of consumers 110 (or other identifying data such as an address of the consumer 110), transaction card 140 numbers, or other unique identification data, and a column 502*b* for respective risk indicators 138*a-n* of respective consumers 110*a-n*. FIG. 5 illustrates a database 136 that is searchable based on a name of the consumer 120 or a transaction card 140 number, but other types of transaction card data 142 may also be utilized.

A risk indicator 138 can also be updated or adjusted as additional data about a consumer 110 is obtained by the risk assessment system 134 in order to reflect a current risk indicator 138 for each consumer 110 as the consumer 110 is involved in more transactions over time. Further, in the event that the database 400 does not include any information regarding a particular consumer 110, the risk assessment system 134 can notify the merchant 110 that no information is available and generate a new risk indicator 138 for the new consumer 110, which may then be updated as the consumer 110 is involved in other transactions.

Figure 6:
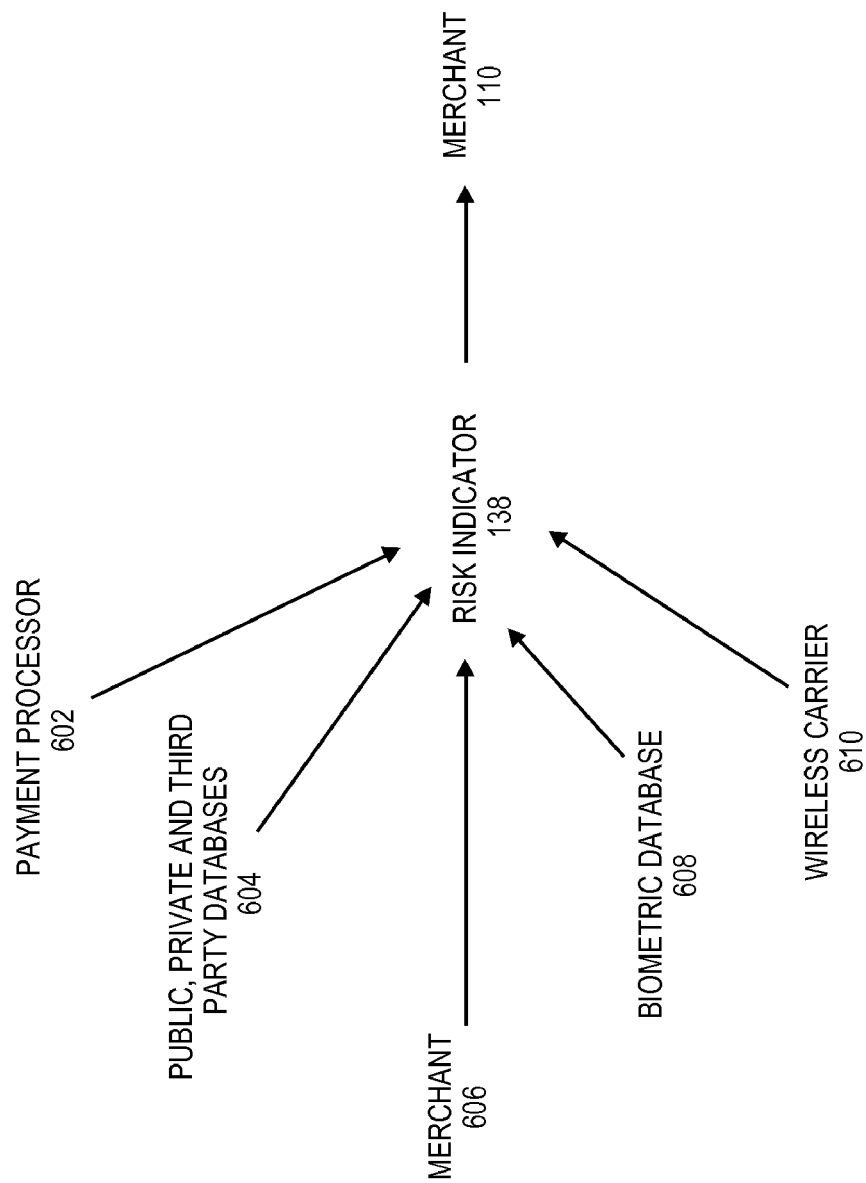
FIG. 6 generally illustrates different sources of data that may be utilized to generate or update a risk indicator according to one embodiment.
Figure 7:
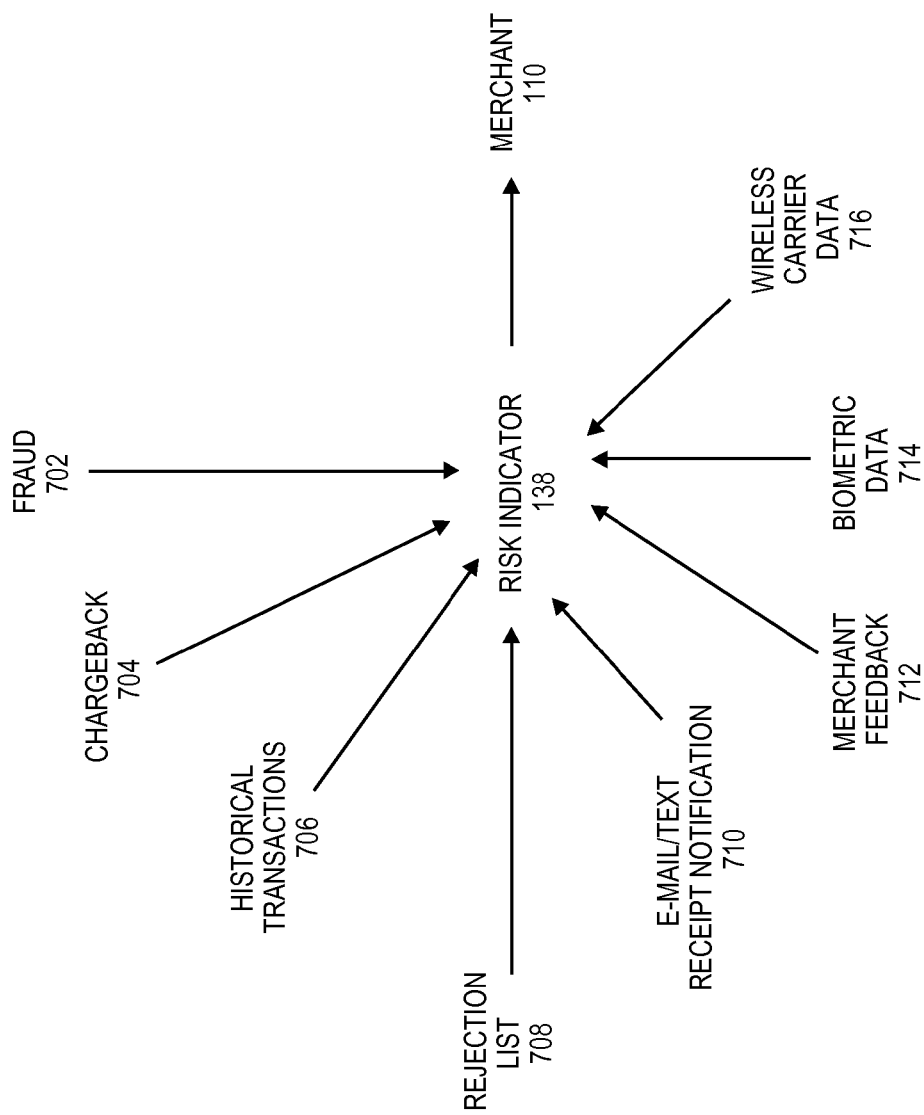
FIG. 7 generally illustrates different types of data that may be utilized to generate or update a risk indicator according to one embodiment.

For example, referring to FIGS. 6-7, a risk indicator 138 can be generated or updated based on various types of data from various sources. As shown in FIG. 6, sources of data that can be used to generate or update a risk indicator 138 include one or more or all of records or data 602 maintained by the payment processor 130, public, private or third party databases 604, data bases including data or feedback 606 provided by the same or another merchant 110, e.g., feedback provided to the risk assessment system 134, biometric databases 608 and a wireless carrier 610 that provides wireless communication services to a consumer 120 and/or the merchant 110.

Referring to FIG. 7, types of data that can be used to generate or update a risk indicator 138 include one or more or all of prior fraud 702 and prior chargebacks 704 that may, for example, be recorded and maintained by the payment processor 130, other historical transaction data 706 such as the number of transactions during which the consumer 110 has used the transaction card 140 for electronic payment, a list 708 of consumers 110 or transaction cards 140 that should be automatically rejected, confirmation that the transaction was completed as shown by a notification 710 indicating that the consumer 110 read or opened an electronic receipt (e.g., in the form of an e-mail or text message) that was sent from the mobile device 150 of the merchant 110 to a mobile device of the consumer 120, feedback or score data 712 sent by the same or another merchant 110 to the risk assessment system 134, e.g., after a transaction has been completed, biometric data 714 such as fingerprints, photographs, and voice samples, and personal identification or location information 716 provided by a wireless carrier. Sources and types of data that may be utilized to generate or update a risk indicator 138 are discussed in further detail below with reference to FIGS. 8-11.

In certain embodiments, a risk indicator 138 is based on or determined by considering only one type of data from a single data source. For example, a risk indicator 138 may be based on only upon the number of prior chargebacks 704, based only upon a rejection list 708, based only upon electronic receipt confirmation notifications 710, based only upon biometric data 714, based only upon wireless carrier data 716, based only upon merchant feedback 712, or based only on certain public, private or third party data sources.

In other embodiments, a risk indicator 138 is based on or determined by considering multiple types of data. These different types of data may be retrieved from or supplied by the same source (e.g., a payment processor 130) or different sources. Thus, a first portion of a risk indicator 138 may relate to a first type of data, such as credit history data including prior fraud, chargeback and transaction history data, from a first source, such as the payment processor 130. A second portion of the risk indicator 138 may relate to a different type of data, such as personal identification or authentication data, which is retrieved from or supplied by another source. System and method embodiments involving risk indicators 138 that are based on different types of data and/or data from different sources are described with reference to FIG. 8.

Figure 8:
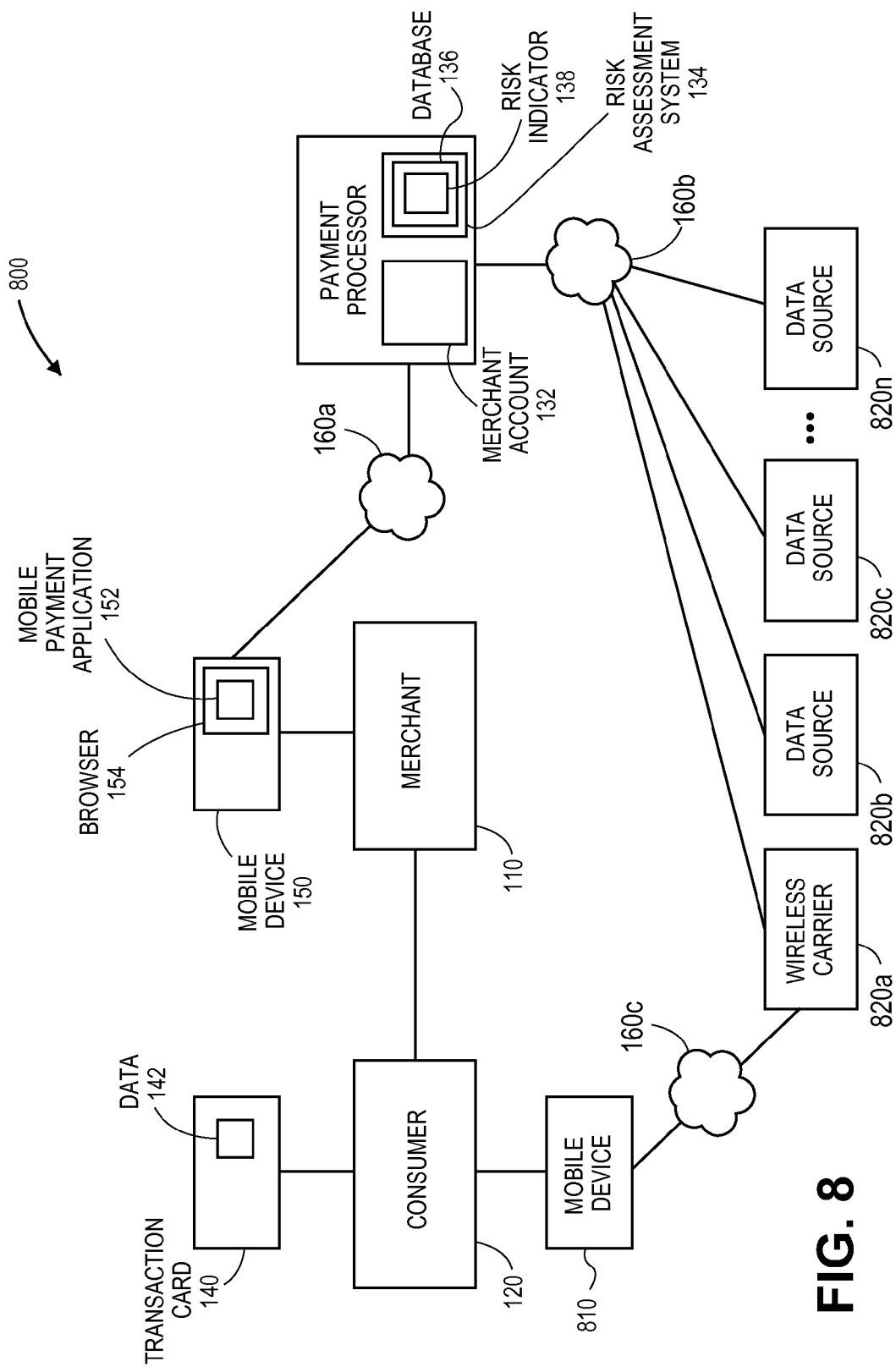
FIG. 8 is a block diagram of a system constructed according to another embodiment for assessing the risk associated with accepting payment from a consumer according to another embodiment.
Figure 9:
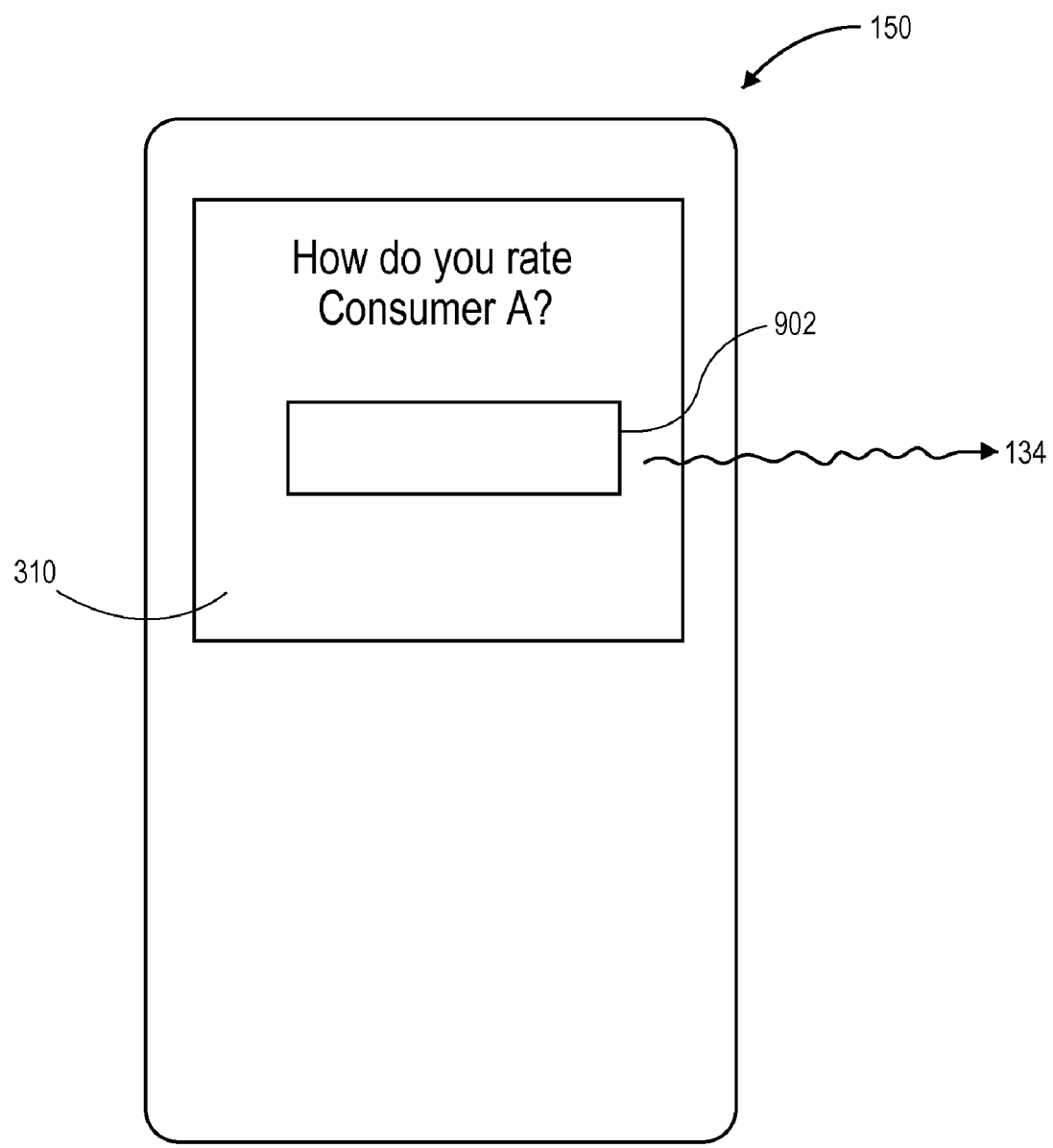
FIG. 9 generally illustrates a mobile device of a merchant and a page displayed by a payment application for allowing the merchant to rate the consumer for purposes of generating or updating a risk indicator according to one embodiment.

Referring to FIG. 8, a system 800 constructed according to another embodiment that utilizes risk indicators 138 based on or comprised of different types of data (e.g., credit data and personal identification or authentication data) that may be from the same or different sources may comprise a consumer 110 having a cellular telephone or other mobile device 810, a merchant 110 having a payment device such as a cellular telephone or other mobile device 150 or a non-mobile payment device or terminal for accepting electronic payment, a payment processor 130 hosting a merchant account 132 and a risk assessment system 134, a transaction card 140 and one or more networks 160*a-c* (generally network 160).

Aspects of system 800 components and parties to a transaction discussed with reference to FIGS. 1-7 are not repeated for ease of explanation. Further, as previously discussed, while embodiments may involve or be implemented using mobile devices 150, other embodiments may involve or be implemented using non-mobile payment devices such as payment devices at retail establishments. For ease of explanation, reference is made to payment devices generally or to mobile devices. However, it should be understood that such descriptions, FIG. 8 and related figures are provided in a non-limiting manner to describe how certain embodiments may be implemented, and that other embodiments of the invention may involve or be implemented using non-mobile payment devices.

In the embodiment illustrated in FIG. 8, the system 800 includes one or more data sources 820*a-n* (generally 820) that may be accessed to generate or update respective risk indicators 138 for respective consumers 110 or transaction cards 140. One example of a data source 820 that includes credit, credit history or prior transaction data (generally referred to as credit data) related to the consumer 110 is a data source managed or accessed by the payment processor 130 and that includes a list of consumers 110 that should be rejected automatically as a result of past fraud or chargebacks. One example of a rejection list 708 that may be used to generate a risk indicator 138 is based on data from ECHO®, a database that is used to process electronic check payments and that includes names of high risk consumers 110 determined to have been involved in prior fraud and/or chargebacks. Thus, if the merchant 110 transmits transaction card data 142 including a name or address of a consumer 110 or a particular transaction card 140, and that name, address or card number is included in the rejection list 708, then the risk assessment system 134 may be configured to automatically generate a "decline" or "rejected" indicator 138. This "decline" or "rejected" indicator 138 is provided to the payment device such as a mobile device 150 and displayed to the merchant 110 to inform the merchant 110 that the transaction card 140 should be declined or rejected. It should be understood, however, that other rejection list data sources 820 may be utilized, and ECHO® is provided as one example of a rejection list database that may be utilized for this purpose.

Another example of a data source 820 including credit data related to the consumer 110 and that can be used by the risk assessment system 134 to generate or update risk indicators 138 includes historical transaction data including such as a number of transactions the consumer 120 has completed, a number of successful transactions, and a number of transactions resulting in fraud or chargebacks. These types of data may, for example, be stored in a database 820 that is hosted by or accessible by the payment processor 130.

Another data source 820 that includes credit data related to the consumer 110 and that can be used by the risk assessment system 134 includes feedback from the same or another merchant 110. For example, referring to FIG. 9, upon completing a transaction, the risk assessment system 134 may cause the mobile payment application 152 to generate a page 900 that is displayed to the merchant 110 to allow the merchant 110 to provide feedback regarding the consumer 110 or to rate the consumer 120. In the illustrated embodiment, a feedback page 900 asks the merchant "How do you score this consumer" and includes a field 902 in which the merchant 110 can enter a rating or score, e.g., an indicator score 410 ranging from 1 to 100 as in the example discussed with reference to FIGS. 4D-E, or an indicator score 420 that may be positive or negative as discussed with reference to FIGS. 4E-F. This feedback is sent back to the risk assessment system 134 through the network 160*a* and is used as a new risk indicator or score 138, e.g., if no risk indicator 138 currently exists for that particular consumer 110, or to update an existing risk indicator or score 138. For this purpose, multiple indicators 138 can, for example, be averaged or determined using another method.

Further, if the feedback score is significantly lower than an existing risk indicator or score 138, the risk assessment system 134 can compare those two indicators 138, and if the difference is larger than a pre-determined difference, generate or update a risk indicator 138 such that when this consumer 110 is encountered again, the merchant 110 is sent an indicator 138 that informs the merchant 110 not to deal with the consumer 110 or to proceed with caution. Other embodiments may involve modifying or updating a risk indicator 138 in other ways, and the methods described above are provided as illustrative examples of how embodiments can be implemented.

Figure 10:
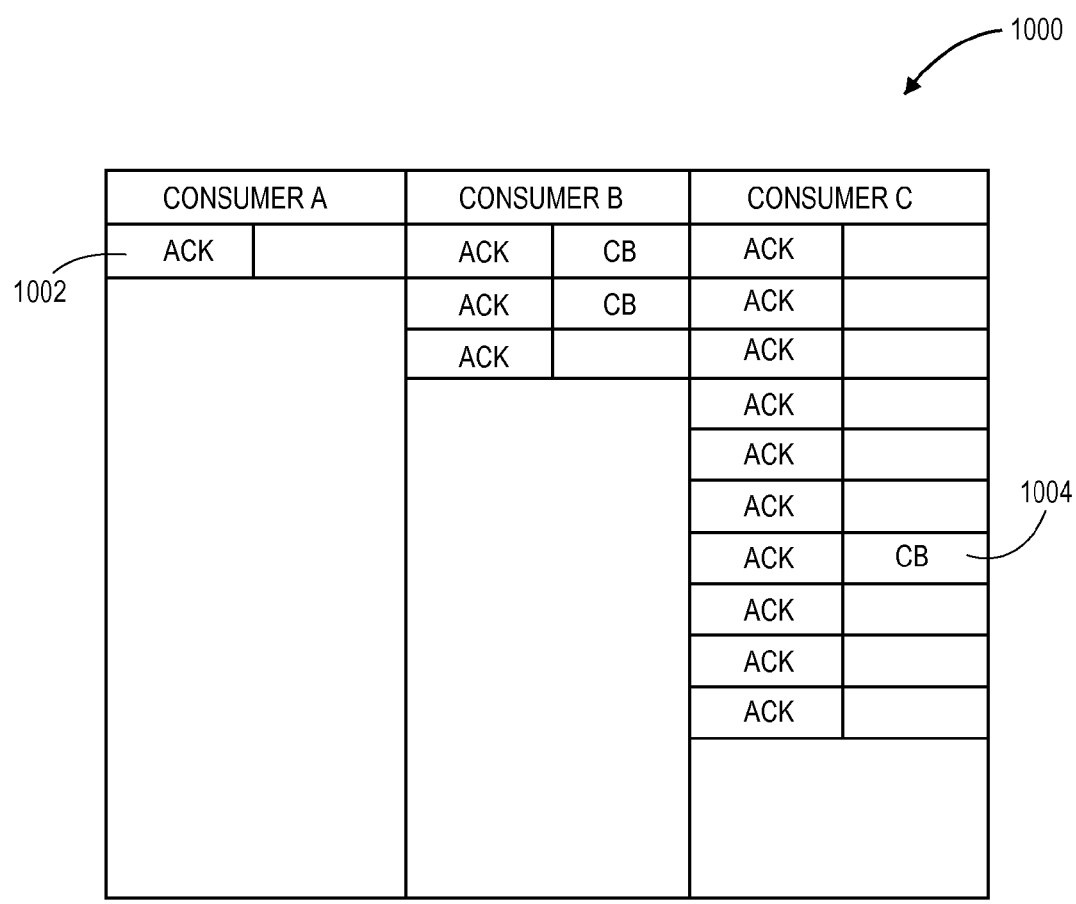
FIG. 10 illustrates a database or table of e-mail receipt acknowledgements for different consumers that may be used to generate or adjust a risk indicator based on confirmed payment histories according to one embodiment.

Referring to FIG. 10, the risk assessment system 134 can also generate or update a risk indicator 138 based on credit-related data in the form of notifications confirming that the consumer 110 has read or opened an e-mail or text receipt that was generated using the mobile payment application 152 and sent from the mobile device 150 of the merchant 110 to a mobile device 810 of the consumer 120. More specifically, upon completion of a transaction, the mobile payment application 152 allows the merchant 110 to generate an electronic receipt. The receipt may be in the form of an electronic mail or text message and is transmitted over a wireless network to the mobile device 810 of the consumer 120. The consumer 120 may then open the electronic mail or text message to read the receipt, in response to which a notification is sent from the mobile device 810 of the consumer 120 to the mobile device 150 of the merchant 110. The mobile device 150 forwards the notification confirming that the consumer 120 read or opened the electronic receipt, or an indication that a notification was received by the merchant 110, to the risk assessment system 134 hosted by the payment processor 130. As shown in FIG. 10, these notifications 1002 or indications that notifications were received can be tracked and stored in a database 1000 to demonstrate the number and frequency of successful transactions and credit worthiness of the consumer 110.

In the illustrated embodiment, the database 1000 may indicate the number of read acknowledgements 1002 such that a larger number of acknowledgements 1002 can be associated with a more reliable and consistent payment by the consumer 110 which, in turn, may result in lower risk and chargeback and a lower risk indicator 138 for that consumer 110. Further, the database 1000 may be structured to also include data 1004 that indicates whether a certain transaction as identified by a corresponding acknowledgment 1002 resulted in a negative result such as a chargeback (cb) as shown in FIG. 10. In the illustrated example, one notification 1002 was recorded for Consumer 1, and that transaction did not result in a chargeback, three notifications 1002 were recorded for Consumer 2, and two of the three transactions resulted in a chargeback, which may result in an increased risk indicator 138 and may result in a "rejected" or "denied" risk indicator given the number of chargebacks 1004 relative to the number of transactions 1002. Ten notifications 1002 were recorded for Consumer 3, and only one of the ten transactions as identified by corresponding acknowledgements 1002 resulted in a chargeback 1004, which may result a slightly higher risk indicator 138, but may or may not result in a "rejected" or "denied" risk indicator given the small number of chargebacks relative to the number of transactions, but this risk assessment could change if additional chargebacks occur. Thus, the database 1000 maintaining records of notifications 1002 confirming opening or reading of electronic mail or text message receipts may be used to generate a risk indicator 138 or to adjust a risk indicator 138 as necessary, and the larger number of acknowledgements 1002 that are received and that do not result in a charge back result in a lower level risk indicator 138.

One or more data sources 820 that are used to generate or update risk indicators 138 of respective consumers 110 may also be various public, private and third party databases that include verifiable personal identification or authentication information to confirm that the consumer 110 is the same person as the person named on the transaction card 140. Examples of such data sources 820 include, but are not limited to, United States Postal Service Address Verification, Department of Motor Vehicles (DMV), Equifax and other credit databases, United States Postal Service Address Verification, Social Security and Internal Revenue Service (IRS) databases (if access permitted) and third party business and legal databases such as Dun & Bradstreet®, Lexis®, Nexis® and Westlaw®. Dun & Bradstreet® is a registered trademark of Dun & Bradstreet Corporation, Lexis® and Nexis® are registered trademarks of Reed Elsevier Properties, Inc., Westlaw® is a registered trademark of West Licensing Corporation. It should be understood that other data sources may be utilized depending on the types of data required.

In addition to considering credit-related data such as prior transaction data, the risk assessment system 134 can also generate or update a risk indicator 138 using personal identification data such as biometric data. Examples of biometric data include voice samples, fingerprints, photographs and other forms of identifying features to verify whether the consumer 110 is the person named on the transaction card 140.

For example, during a transaction, when the transaction card 140 is tendered by the consumer 120, the merchant 110 can use the mobile payment application 152 to activate a voice recording module of the mobile device 150 and request the consumer 120 to read a sentence displayed by the mobile payment application 152. The voice sample acquired using the mobile device 150 is transmitted over the network 160*a* to the risk assessment system 134, which compares the acquired voice sample to a previously recorded voice sample to determine whether they match.

The previously recorded voice samples can be acquired by or accessed from a database of the risk assessment system 134 that stores previously acquired voice samples. A consumer 120 may agree to submit voice samples for use in embodiments in order to increase his or her indicator or score 138. If the voice samples match, then the risk assessment system 134 can generate a risk indicator 138 that has a low risk value and/or that indicates that the merchant 110 can proceed with the transaction and accept payment using the mobile device 150 and transaction card 140 or other form of payment. However, if the voice samples do not match, then, the risk assessment system 134 generates a risk indicator 138 that is a high risk score and/or that indicates that the merchant 110 should not proceed with the transaction or obtain additional data verifying the identity of the consumer 120.

A similar method may be used for other types of biometric data such as fingerprints and photographs. For example, when the transaction card 140 is tendered by the consumer 120, the merchant 110 can use the mobile payment application 152 to activate a digital camera of the mobile device 150 that is used to acquire a photograph of a face or fingerprint of the consumer 120 or employ a separate fingerprint scanner. The photograph and/or scanned image are transmitted over the network 160a, and the risk assessment system 134 compares the acquired images to previously recorded images to determine whether the images match. The risk assessment system 134 can access and/or store photographs that were previously provided by a consumer 120 and stored in a database and/or retrieved from a third party or government database. If the photographs and/or fingerprints match, then the risk assessment system 134 can generate or adjust the risk indicator 138 to indicate a low risk and/or that indicates that the merchant 110 can proceed with the transaction and accept payment with the mobile device 150 and transaction card 140. However, if the photographs and/or fingerprints do not match, then given the personal and reliable nature of the data, the likely result is that the consumer 110 is not the same person as identified on the transaction card 140. In these cases, the risk assessment system 134 can generate a risk indicator 138 that indicates a high risk of fraud or chargeback and/or that indicates that the merchant 110 should not proceed with the transaction.

Biometric data can be used in the black list or rejection list 610. For example, when a fraudulent person reuses multiple cards, his or her face, fingerprint, and/or other biometric data can be added to the rejection list 610 such that the rejection list 610 can include both credit or transaction related data as well as personal identification or authentication data.

Referring again to FIG. 8, the risk assessment system 138 can also generate or update a risk indicator 138 using personal identification and/or location data provided by a wireless carrier source 820 (820a in FIG. 8) that is in communication with the mobile device 810 of the consumer 120 through a network 160c and in communication with the risk assessment system 134 through a network 160b. The wireless carrier 810a provides wireless or cellular communication services to the consumer 120 and is requested by the risk assessment system 134 to verify the identity and/or location of the consumer 110. Data from a wireless carrier 820 of the consumer 120 may allow the risk assessment system 134 to determine personal identification information such as the name on the transaction card 140 matches the name of the consumer 120 as reflected in the wireless carrier 810a records and whether the location of the cellular telephone 810 of the consumer 120 matches or is within a certain area or location of the consumer 120 having a cellular telephone 810 or within a certain area of the billing zip code of the consumer 120 tendering the transaction card 140.

For example, when the transaction card 140 is tendered by the consumer 120, the merchant 110 can use the mobile payment application 152 to transmit the name and/or cellular telephone number of the consumer 120 to a wireless carrier 820a (such as Verizon Wireless, ATT Wireless, Sprint), or to the risk assessment system 134, which then transmits the data to the wireless carrier 820a. The wireless carrier 820a looks up the cellular telephone records of the consumer 120 and provides personal identification data such as the name, address and/or zip code of that person back to the risk assessment system 134 or to the mobile device 150 of the merchant 110. Data received from the wireless carrier 820 can then be verified against personal identification data 142 acquired from the transaction card 140.

Additionally, or alternatively, in response to a request from the mobile payment application 152 or the risk assessment system 134, the wireless carrier 820a can send location data that identifies the location of the mobile device 810 of the consumer 120. The location data can also be compared against the billing zip code of the consumer 120 as determined from the transaction card 140. If the location data from the wireless carrier 820a matches or substantially matches the location of the consumer 120 and/or the billing zip code, the merchant 110 can have increased confidence that the transaction card 140 naming the consumer 120 is owned by the consumer 120 as confirmed by the location of the cellular telephone 810 of the consumer 120. However, if the location data received from the wireless carrier 812a indicates that the location of the mobile device 820 of the person named on the transaction card 140 is somewhere other than the location of the consumer 120, or if the billing zip code does not match or is sufficiently far away, then this may indicate that the consumer 120 may not be the owner of the transaction card 140 and that the real owner of the transaction card 140 (and his or her mobile device) are located at a different geographic location. In this case, the risk assessment system 134 may generate a high risk score or indicator 138 that the merchant 110 should reject or decline the transaction card 140. Thus, the wireless carrier data source 820a and associated data, including personal and cellular telephone location data, may be used to generate or update a risk indicator 138, and may be used in conjunction with credit-related data such as prior fraud, prior chargebacks and historical transaction data to generate or update a risk indicator 138.

In embodiments in which different types of data are utilized to generate or update a risk indicator 138, the risk indicator 138 can be a weighted to emphasize the relative importance of the data and/or the source. Thus, a first portion of the weighted indicator score is attributable to a first type of data, a second portion of the weighted indicator score is attributable to a second type of data that is different than the first type of data, and so on for each type of data.

Figure 11A:
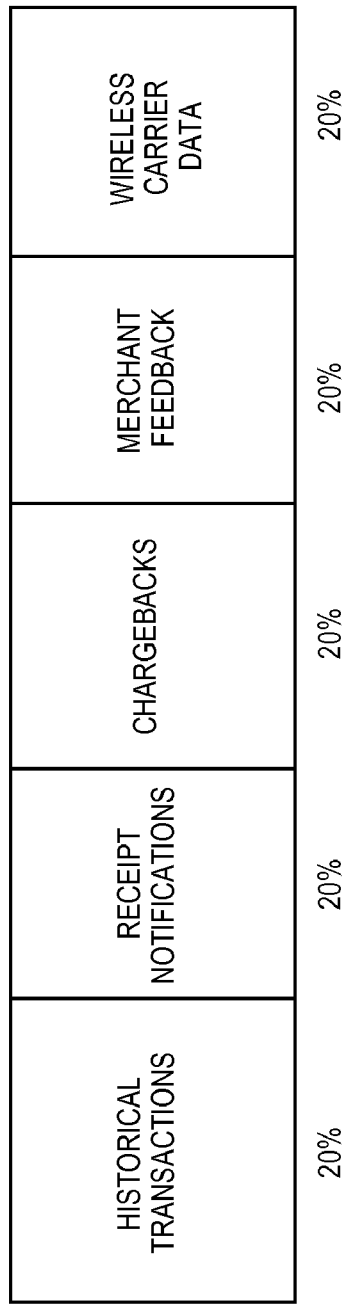

For example, in one embodiment as shown in FIG. 11A, each type of data used to generate or update an indicator 138, e.g., a score 410, is assigned an equal weight such that the risk assessment based on each type of data has equal weight for generating or adjusting a risk score 410. In the illustrated embodiment, the risk score is based on five types of data including types of credit-related data including historical transactions, e-mail receipt notifications, chargebacks and merchant feedback and personal identification or authentication data such as data from a wireless carrier 820a of the consumer 120. In the illustrated embodiment, each data type is assigned a weight of 20% since, in this embodiment, each type of data is considered to be equally relevant to the final risk indicator or score 138.

Figure 11B:
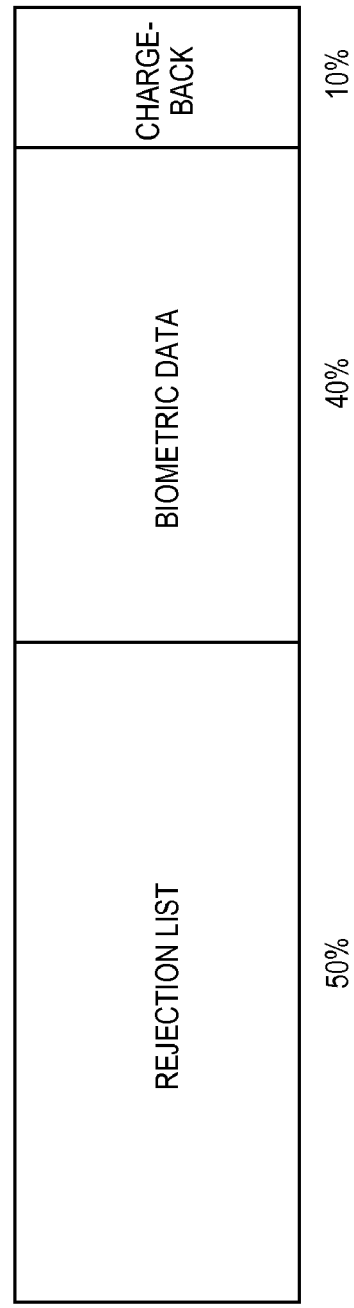

Referring to FIG. 11B, a risk indicator or score 410 may be generated or adjusted based on different types or sources of data being assigned different weights such that certain data contributes more strongly to the final risk score 410. For example, inputs to the risk score 410 are weighted such that 50% of the risk score 410 is attributable to a value assigned based on whether the consumer 110 is included in the rejection list (type of credit-related data), 10% of the risk score 410 is attributable to whether the consumer 110 was previously associated with fraud or chargebacks (another type of credit-related data), and the remaining 40% of the risk score 410 is attributable to biometric data (a type of personal identification or authentication data) such fingerprint or voice recognition.

The significance of the particular data type can be reflected in the weight and/or the value assigned to different outcomes or decisions regarding that data type. Based on a scale of 0-100, the point value assigned to not being on the rejection list may be 10, whereas the point value assigned to being included in the rejection list may be 90 to indicate a high risk of fraud or chargeback. If the consumer 120 was not involved in chargebacks, then the point value assigned to this particular category may be 20, whereas if were chargebacks, then the point value assigned may be 60. The point value assigned for having confirming fingerprints may be 5 (to indicate very low risk), whereas the point value assigned for mismatching fingerprints may be 95. These point values are then averaged or computed according to the selected or assigned weights. It should be understood that different point assignment and weights may be utilized in other embodiments, and that FIG. 11B is provided as an example of how embodiments may be implemented.

Thus, with these exemplary weights and point values, (both of which may be selected by the merchant 110 and/or payment processor 130 depending on preferences), and assuming favorable determinations (i.e., the consumer 110 is not on the rejection list, the fingerprints were verified, and there were no chargebacks), the resulting risk score 410 would be ~9 as calculated by (0.5*10)+(0.4**5)+(0.1*20). This risk score 410 represents very low risk (based on the example risk ranges of 0-33, 34-66 and 66-67 shown in FIG. 4D). This risk score 410 can be sent to the mobile device 150 to indicate to the merchant 110 that payment can be accepted from the consumer 120 using the transaction card 140 and mobile device with low risk of fraud or chargeback.

However, if there were certain unfavorable determinations (e.g., the consumer 110 was not on the rejection list, but the scanned fingerprints of the consumer 120 did not match fingerprints on file or obtained from police records or other public records, and there were no past chargebacks), the resulting risk score 410 would significantly increase to about 45 as calculated by (0.5*10)+(0.4*95)+(0.1 *20). Based on the example risk ranges shown in FIG. 4D, this would signal to the merchant 110 to exercise caution and perform additional identity verifications.

As a further example, if there were certain unfavorable determinations (e.g., the consumer 110 was named on the rejection list and the scanned fingerprints of the consumer 120 did not match fingerprints on file, but there were no past chargebacks), the resulting risk indicator 410 would significantly increase to about 85 as calculated by (0.5*90)+(0.4*95)+(0.1*20). Based on the example risk ranges shown in FIG. 4D, this would signal to the merchant 110 that there is a high risk of fraud or chargeback.

Figure 11C:
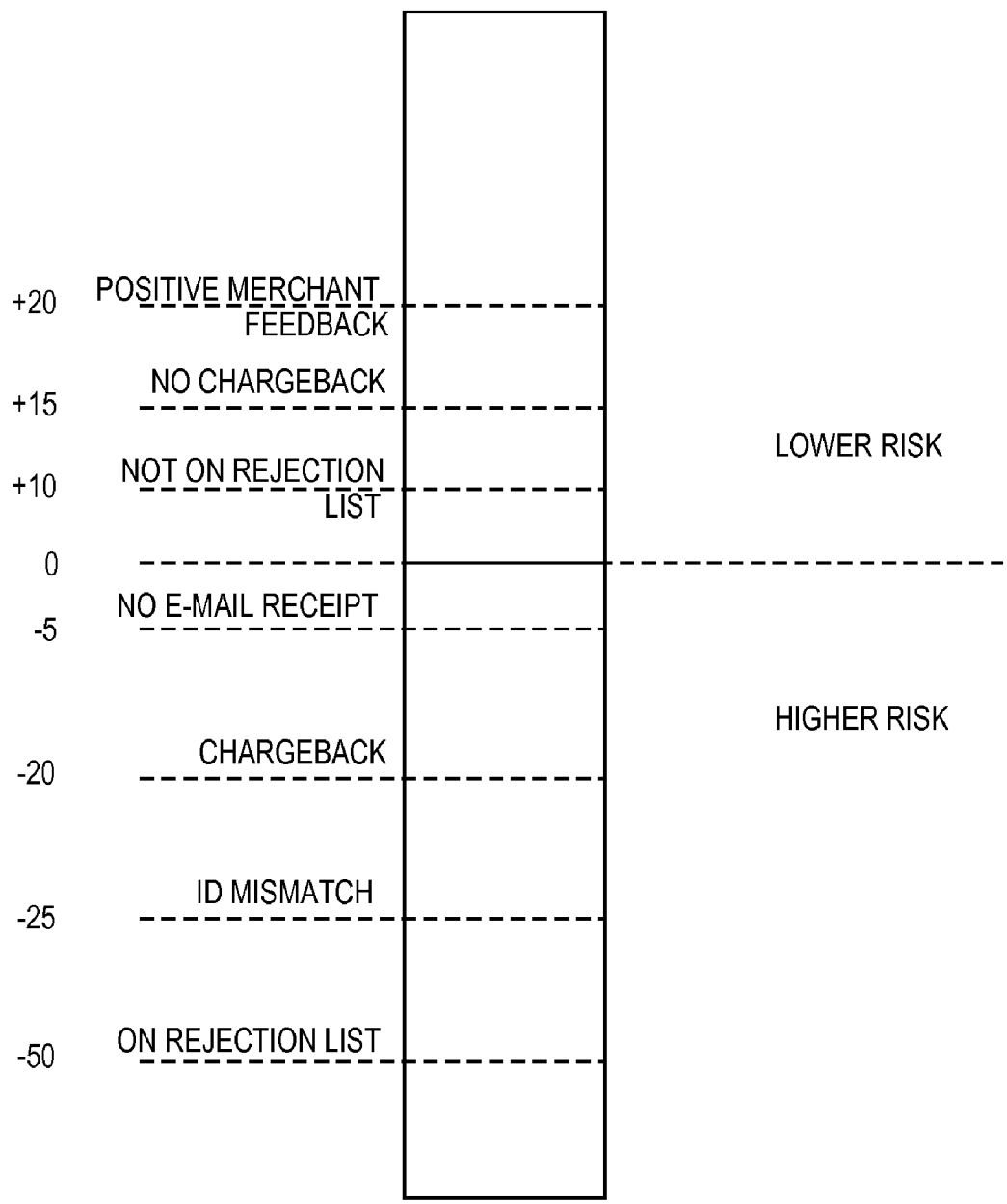

FIG. 11C illustrates one example involving a risk score 420 (as in FIGS. 4E-F) that can be negative to indicate that the merchant 110 should reject the transaction card 140 or positive to indicate that the merchant 110 can accept payment by the transaction card 140. In the illustrated example, certain data types or events are assigned positive values to indicate lower risk and negative values to indicate higher risk of fraud or chargeback. The values can be selected based the relative importance of certain events, data types and data sources.

In the illustrated example, being on the rejection list indicates significant risk (−50) whereas not being named on the rejection list may result in (+20). As another example, a chargeback or mismatch of biometric data may result in certain negative values, whereas no charge backs and positive merchant feedback can result in certain positive values. In one embodiment, the net risk score 420 can be determined by adding the applicable positive and negative values. Thus, if there was one chargeback (−20), but the consumer 120 received positive merchant feedback (+20) and was not on a rejection list (+20), the resulting risk indicator (+20) may indicate that the merchant 110 can proceed with accepting the transaction card 140 using the mobile device 150, or that the merchant 110 should do so upon further verification. As another example, if the consumer 120 is included in the rejection list (−50), the transaction card 140 would be rejected even if the consumer 120 received positive feedback from a merchant (+20). In this case, the resulting risk indicator 420 would be (−30).

Of course, the data types assigned and the corresponding values are provided as examples and can vary. Thus, depending on the point value assigned, certain types of data may outweigh other types of data due to their risk considerations. Types of overriding data may include data that is considered to be particularly reliable or accurate in confirming the identity of the consumer 110 or as being particularly reliable or accurate in confirming that the consumer 110 is not the owner of the transaction card 140. Examples of such reliable data include, for example, biometric data since photographs, voice patterns and fingerprints are unique, the rejection list maintained by the payment processor 130 since the consumer 110 has typically engaged prior negative behavior to be included in the rejection list, and wireless carrier data since it may be likely that a transaction card 140 was stolen if the cellular telephone of the person named on the card 140 is not in the immediate geographic area.

Figure 12:
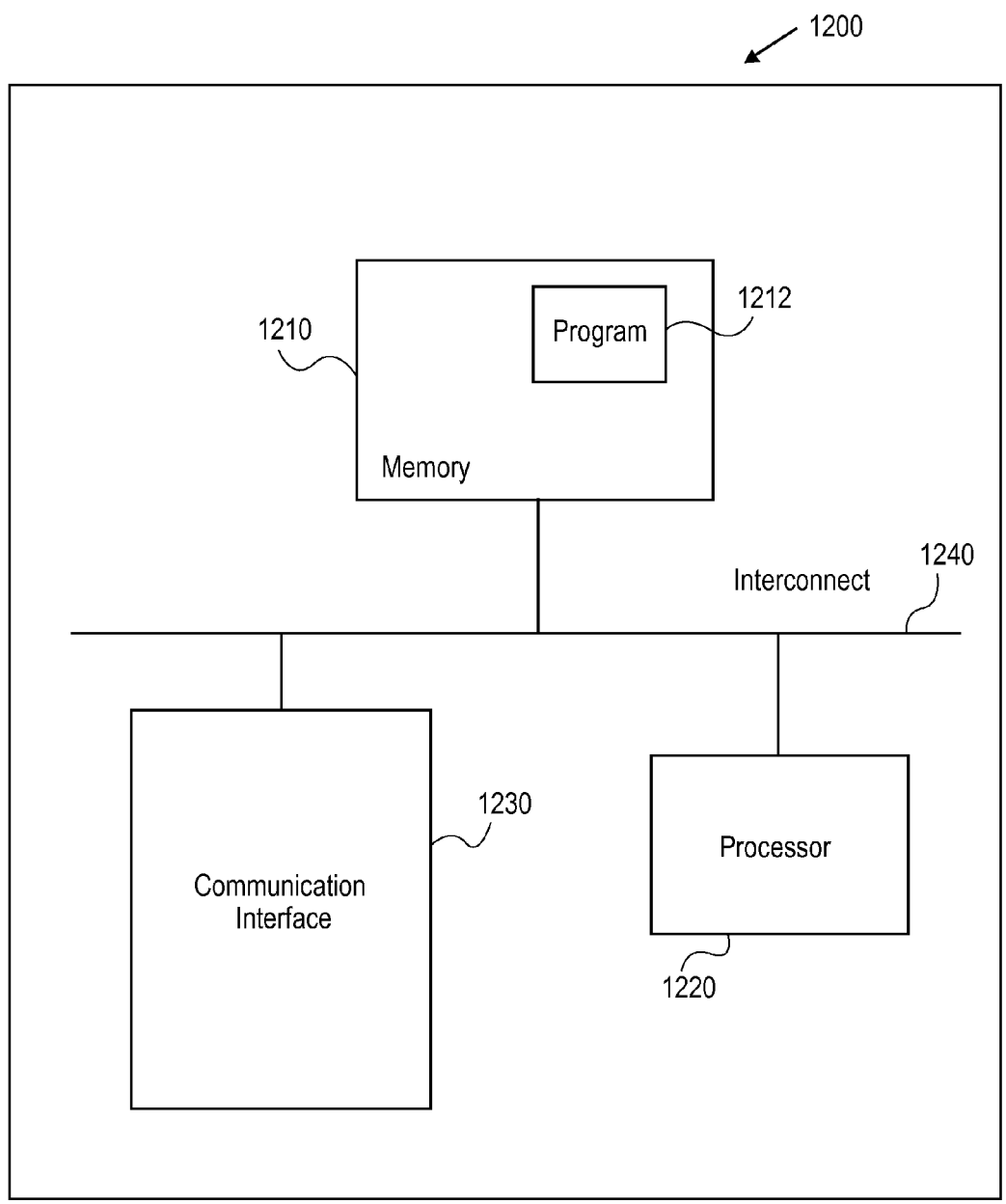
FIG. 12 is a block diagram of components of a computing apparatus in which embodiments may be implemented or that may be utilized in or by embodiments.

FIG. 12 generally illustrates components of a computing device 1200 that may be utilized to execute embodiments and that includes a memory 1210, program instructions 1212, a processor or controller 1220 to execute program instructions 1212, a network or communications interface 1230, e.g., for communications with a network or interconnect 1240 between such components. The memory 1210 may be or include one or more of cache, RAM, ROM, SRAM, DRAM, RDRAM, EEPROM and other types of volatile or non-volatile memory capable of storing data. The processor unit 1220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1240 may include a system bus, LDT, PCI, ISA, or other types of buses, and the communications or network interface may, for example, be an Ethernet interface, a Frame Relay interface, or other interface. The network interface 1230 may be configured to enable a system component to communicate with other system components across a network which may be a wireless or various other networks. It should be noted that one or more components of computing device 1200 may be located remotely and accessed via a network. Accordingly, the system configuration provided in FIG. 12 is provided to generally illustrate how embodiments may be configured and implemented.

Method embodiments or certain steps thereof, may be carried out by execution of software instructions that are embodied in, or readable from, a tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1220 performs steps or executes program instructions 1212 within memory 1210 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference to FIGS. 1-12 and mobile devices and associated mobile payment applications, it should be understood that embodiments may also be applied to non-mobile payment devices such as payment terminals at a retail establishment, and that depending on the configuration of the non-mobile payment device, components shown in FIGS. 1 and 8, such as a mobile payment application and web browser, may not be required in these alternative system configurations. Thus, with embodiments, risk indicators can be provided to mobile and non-mobile payment devices.

Further, certain embodiments are described with reference to GoPayment™ as one example of a mobile payment application that may be used with mobile payment devices, but it should be understood that other mobile payment applications may be used, and that embodiments may be implemented by modifying mobile payment applications such as GoPayment™ or by providing embodiment as an add-on or separate application for use with an existing mobile payment application.

It should also be understood that embodiments may involve different types and/or different numbers of risk indicators, and that risk indicators can be generated or updated using different weights or criteria and different types of data, different sources of data, different numbers of types of data, different numbers of sources of data and different combinations of data types and/or different combinations of data sources.

Further, a risk indicator in the form of a binary or ternary risk indicator such as "accepted/declined" may be generated based on one, two, three, four and other numbers of types of data. Further, a risk indicator in the form of a binary or ternary risk indicator may be generated based on one, two, three, four and other numbers of data sources or databases. For example, such a risk indicator may be based on only the number of prior chargebacks, only a rejection list, only electronic receipt confirmation notifications, only biometric data, only wireless carrier data, only merchant feedback, or only certain public, private or third party data sources. Additionally, such a risk indicator may be based on various numbers and combinations types and sources of data, weights of which may be assigned to indicate the relative importance of each type of data or each data source. Weights may be the same or different. Moreover, embodiments may involve both risk scores and binary or ternary risk indicators so generated and/or updated.

A risk indicator in the form of score or ranking, whether a positive number ranging from 0 to a certain maximum number, or a score or ranking that may be positive or negative, may be generated based on one, two, three, four and other numbers of types of data. Further, such risk indicators may be generated based on one, two, three, four and other numbers of data sources or databases.

Examples are discussed in which certain data types are assigned certain values and/or weights. However, the values and/or weights assigned to particular data types can be adjusted and selected as necessary in order to reflect personal preferences or actual electronic payment experience.

Additionally, risk indicators may be generated, updated or retrieved and sent to a merchant using various system and methods of communication including via a POS terminal or computing device having wireless communication capabilities, SMS, in the mobile payment application, on-line, etc. The manner in which the risk indicator is communicated to a payment device of a merchant may depend on whether the payment device is a mobile payment device or a non-mobile payment device.

Further, while embodiments are discussed with reference to a merchant and consumer in a face-to-face transaction involving a mobile device of the merchant, embodiments may also apply to situations in which the consumer is remote and communicates with the merchant via telephone or Internet. For example, certain embodiments involving on-line purchases or mobile web purchase may involve cross-checking the location of a server with the location of a mobile communication device or cellular telephone.

Embodiments may also apply to conduct transactions within a retail establishment such that non-mobile, retail merchants can conduct transactions utilizing mobile devices. Moreover, embodiments may apply to conduct payment processing transactions within a retail establishment without the use of mobile devices. For example, embodiments may be utilized in payment processing generally to provide a risk indicator to fixed or non-mobile payment terminals of retail merchants. The risk indicator that is sent to a non-mobile payment device of a retail merchant, similar to risk indicators sent to a mobile device, may be based on or comprise weighted score, a first portion of which is attributable to a first type of data such as credit history data, a second portion of which is attributable to a second type of data such as consumer identification or authentication data, as in risk indicators sent to mobile devices. Further, risk indicators sent to non-mobile devices of retail merchants may be based on different types of data that are retrieved from or supplied by different sources.

Embodiments may also involve various types of electronic payment, whether with a mobile device or a non-mobile payment system at a retail establishment, including transaction cards (credit, debit, ATM, gift) and various forms of electronic payment such as ACH, eCheck, carrier billed, PayPal®, etc) and different types of communications. Further, electronic payments may be made using electronic wallets or other mobile payment devices that may be carried by consumers.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A method for assessing risk associated with accepting payment from a consumer during a transaction, the method comprising:
   receiving, at a mobile communication device operable by a merchant to receive payment from the consumer, data related to a transaction card tendered by the consumer to pay for a good or a service provided by the merchant;
   receiving, through a network and at the mobile communication device, a score representing the risk associated with accepting payment from the consumer using the transaction card; and
   determining whether to accept payment from the consumer using the transaction card based at least in part upon the score.

2. The method of claim 1, the score being received at a mobile communication device comprising a smartphone.

3. The method of claim 1, the score comprising a weighted score, a first portion of the weighted score being attributable to a first type of data, a second portion of the weighted score being attributable to a second type of data.

4. The method of claim 3, the first type of data being related to a credit history of the consumer, and the second type of data being related to an identity of the consumer.

5. The method of claim 3, the first type of data including data of one or more prior transactions involving the consumer.

6. The method of claim 5, the data of one or more prior transactions involving the consumer being at least one prior transaction data selected from the group consisting of: a number of transactions involving the consumer, a prior fraudulent transaction involving the consumer, and a prior chargeback involving the consumer.

7. The method of claim 5, the data of one or more prior transactions involving the consumer comprising a notification that the consumer received an electronic mail message receipt confirming a prior transaction.

8. The method of claim 5, the data of one or more prior transactions involving the consumer comprising feedback about the consumer provided by the same or another merchant involved in a prior transaction.

9. The method of claim 3, wherein the first type of data is received from a first source being selected from the group consisting of a database utilize to process electronic checks, a fraud database, and a credit database.

10. The method of claim 9, wherein the consumer also carries a mobile communication device, the second type of data is received from a second source comprising a wireless carrier of the consumer.

11. The method of claim 9, the second type of data comprising biometric data, the indicator being based at least in part upon whether biometric data of the consumer that is acquired when the transaction card is tendered to the merchant matches previously acquired biometric data of the consumer.

12. The method of claim 1, the merchant being at a location other than a retail establishment or office of the merchant.

13. A method for assessing risk associated with accepting payment from a consumer during a transaction, the method comprising:
   receiving, at a mobile communication device operable by a merchant to receive payment from the consumer, data related to a transaction card tendered by the consumer to pay for a good or a service provided by the merchant, the data being received in real-time before the transaction has been completed;
   receiving, at the mobile communication device, an indicator representing the risk associated with accepting payment from the consumer using the transaction card, the indicator being received in real-time before the transaction has been completed; and
   determining whether to accept payment from the consumer using the transaction card based at least in part upon the indicator in real-time before the transaction has been completed.

14. The method of claim 13, the indicator being received at a mobile communication device comprising a smartphone.

15. The method of claim 13, the indicator comprising a weighted score, a first portion of the weighted score being attributable to a first type of data, a second portion of the weighted score being attributable to a second type of data.

16. The method of claim 15, the first type of data being related to a credit history of the consumer, and the second type of data being related to an identity of the consumer.

17. The method of claim 15, wherein the first type of data is received from a first source comprising a database utilize to process electronic checks, a fraud database, or a credit database, and the second type of data is received from a second source comprising a wireless carrier of the consumer.

18. The method of claim 15, wherein the first type of data is received from a first source being selected from the group consisting of a database utilized to process electronic checks, a fraud database, and a credit database.

19. The method of claim 18, wherein the consumer also carries a mobile communication device, the second type of data is received from a second source comprising a wireless carrier of the consumer.

20. The method of claim 18, the second type of data comprising biometric data, the indicator being based at least in part upon whether biometric data of the consumer that is acquired when the transaction card is tendered to the merchant matches previously acquired biometric data of the consumer.

21. The method of claim 13, the indicator being selected from the group consisting of a score, a grade, a color, a letter, and a combination of two or more types of indicators.

22. The method of claim 13, the merchant being at a location other than a retail establishment or office of the merchant.

23. A method for assessing risk associated with accepting payment from a consumer during a transaction, the method comprising:
   receiving, at a mobile communication device operable by a merchant to receive payment from the consumer, data related to a transaction card tendered by the consumer to pay for a good or a service provided by the merchant, the data being received in real-time before the transaction has been completed;
   receiving, through a network and at the mobile communication device, an indicator representing the risk associated with accepting payment from the consumer using the transaction card, the indicator being based at least in part upon data of one or more prior transactions involving the consumer, the data being received in real-time before the transaction has been completed; and determining whether to accept payment from the consumer using the transaction card based at least in part upon the score and in real-time before the transaction has been completed.

24. The method of claim 23, the data of one or more prior transactions comprising a number of transactions involving the consumer.

25. The method of claim 23, the data of one or more prior transactions comprising a prior fraudulent transaction involving the consumer.

26. The method of claim 23, the data of one or more prior transactions comprising a prior chargeback involving the consumer.

27. The method of claim 23, the data of one or more prior transactions comprising a notification that the consumer received an electronic mail message receipt confirming a prior transaction.

28. The method of claim 23, the data of one or more prior transactions comprising feedback about the consumer provided by the same or another merchant involved in a prior transaction.

29. The method of claim 23, the merchant being at a location other than a retail establishment or office of the merchant.

* * * * *